United States Patent [19]
Yamazaki et al.

[11] Patent Number: 6,078,751
[45] Date of Patent: Jun. 20, 2000

[54] IMAGE-SHAKE CORRECTING DEVICE

[75] Inventors: Tatsuya Yamazaki, Tokyo; Hiroto Ohkawara, Ibaraki-ken, both of Japan

[73] Assignee: Canon Kabushiki Kaisha, Tokyo, Japan

[21] Appl. No.: 08/978,011

[22] Filed: Nov. 25, 1997

Related U.S. Application Data

[63] Continuation of application No. 08/426,835, Apr. 24, 1995, abandoned.

[30] Foreign Application Priority Data

| Apr. 27, 1994 | [JP] | Japan | 6-110129 |
| Apr. 27, 1994 | [JP] | Japan | 6-110130 |
| Jul. 29, 1994 | [JP] | Japan | 6-197222 |

[51] Int. Cl.[7] ......................... G03B 7/08
[52] U.S. Cl. ........................... 396/55
[58] Field of Search ............ 396/52.55; 348/208; 359/554, 557

[56] References Cited

U.S. PATENT DOCUMENTS

| 4,780,739 | 10/1988 | Kawakami et al. | 354/430 |
| 4,855,585 | 8/1989 | Nonaka | 250/201 |
| 5,083,150 | 1/1992 | Nagasaki et al. | 354/402 |
| 5,107,293 | 4/1992 | Sekine et al. | 354/430 |
| 5,170,255 | 12/1992 | Yamada et al. | 358/222 |
| 5,198,896 | 3/1993 | Kondo et al. | 358/105 |
| 5,309,250 | 5/1994 | Giacometti | 358/406 |
| 5,396,336 | 3/1995 | Yoshii et al. | 348/345 |
| 5,440,367 | 8/1995 | Suda | 354/402 |

FOREIGN PATENT DOCUMENTS 05328197  12/1993  Japan ................. H04N 5/232

*Primary Examiner*—Safet Metjahic
*Assistant Examiner*—Michael Dalakis
*Attorney, Agent, or Firm*—Fitzpatrick, Cella Harper & Scinto

[57] ABSTRACT

An image-shake correcting device includes structure for detecting a vibration, and a device for correcting a motion of an image due to the detected vibration. Limiting circuitry is provided for limiting a frequency response of an output of the detecting structure, and switching structure is provided for switching the correcting device between a stopping state and a driving state. Control circuitry is provided for changing a frequency response characteristic of the limiting circuitry when the correcting device is switched from the stopping state to the driving state by the switching structure.

16 Claims, 21 Drawing Sheets

F I G.11
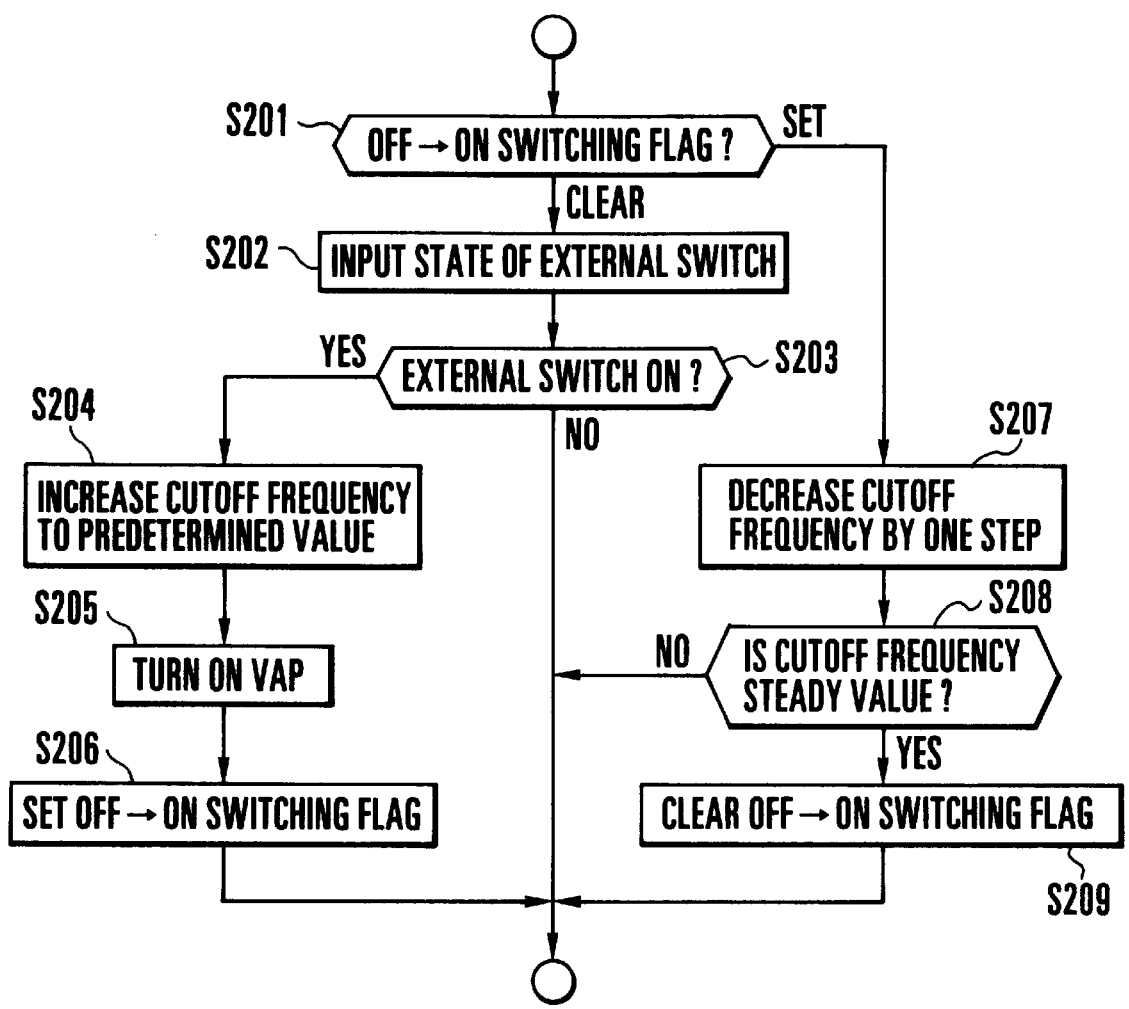

F I G.15
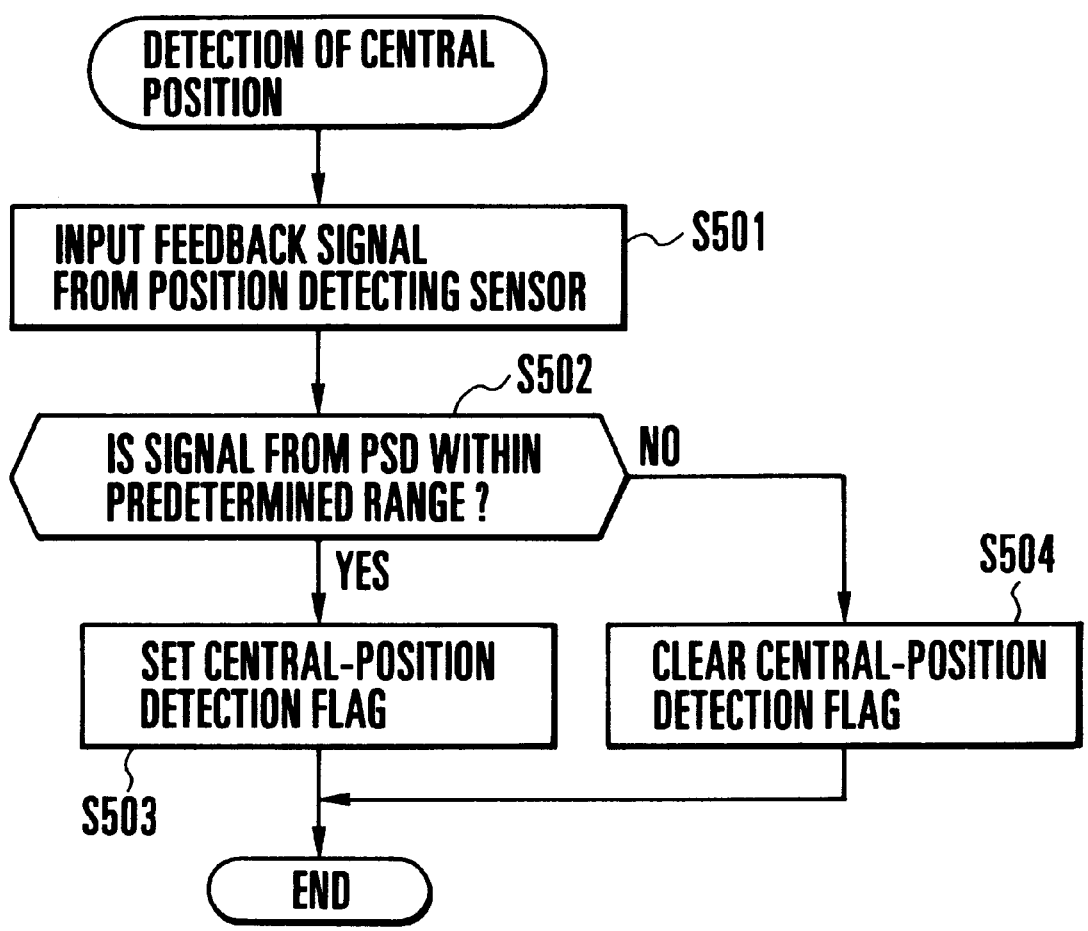

F I G.19(a)
AXIS OF COORDINATES FOR DETECTION OF VISUAL LINE — HORIZONTAL DIRECTION Y
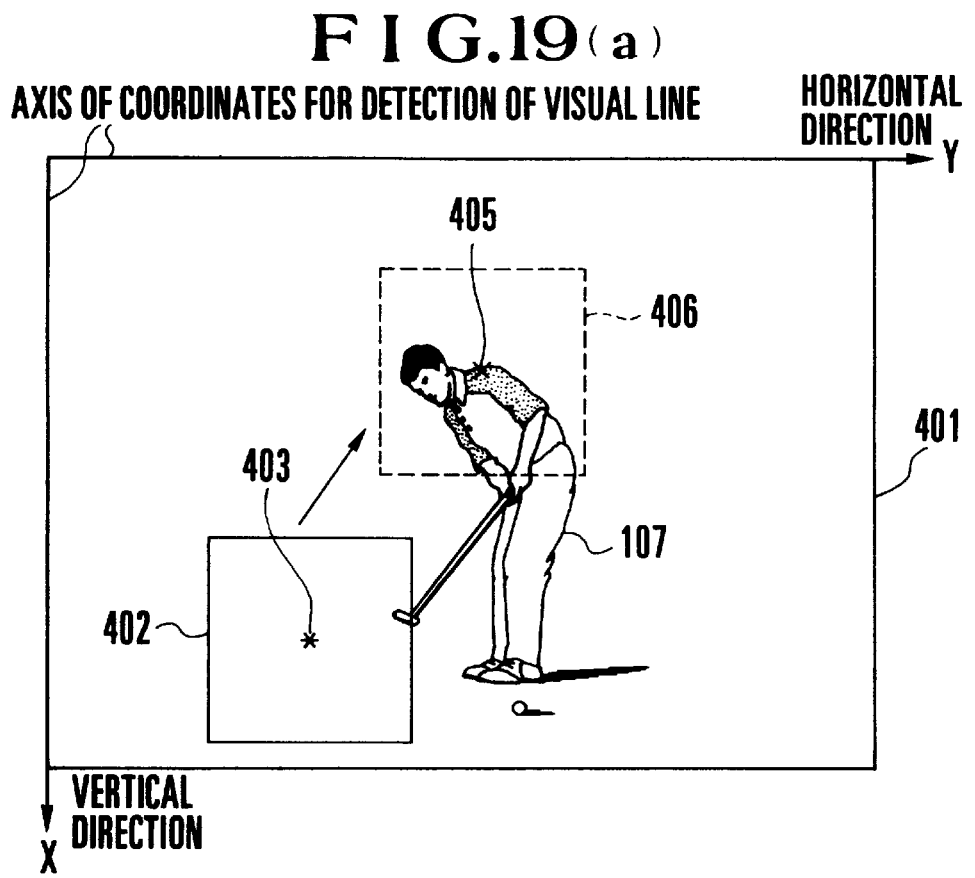
VERTICAL DIRECTION X
F I G.19(b)
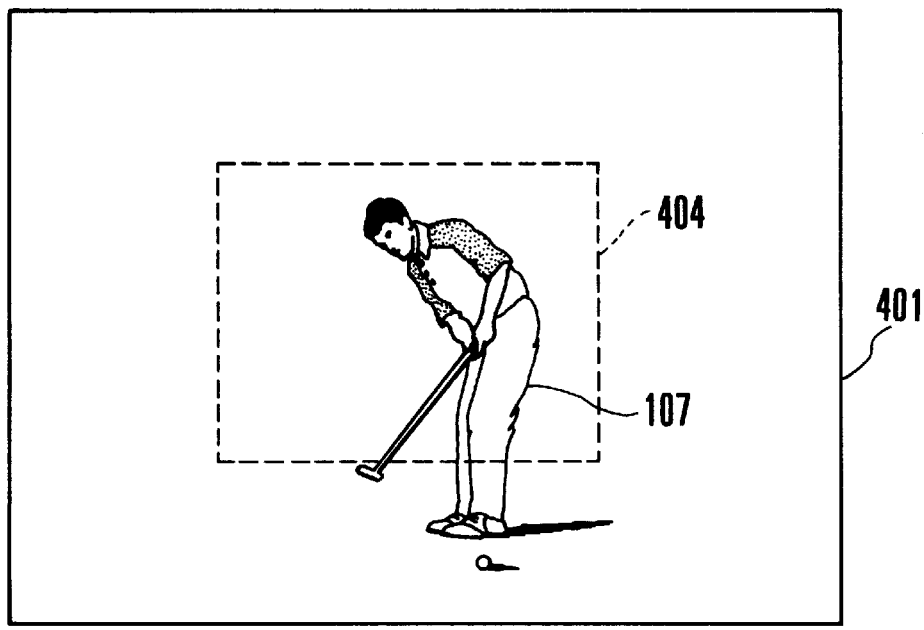

IMAGE-SHAKE CORRECTING DEVICE

This application is a continuation of application Ser. No. 08/426,835, filed Apr. 24, 1995, now abandoned.

BACKGROUND OF THE INVENTION:

1. Field of the Invention

The present invention relates to an image-shake correcting device for use in performing image-shake correction in a photographic camera, a video camera or the like and, more particularly, to an image-shake correcting device capable of preventing an abnormal motion of an image from occurring at the instant when the image-shake correcting device is turned on or off.

2. Description of the Related Art

In the field of photographic apparatuses such as still cameras or video cameras, various operations, such as exposure setting and focus adjustment, have heretofore been automated and an increased number of functions have been incorporated into one photographic apparatus. Accordingly, even beginners have become able to easily enjoy high-quality photography.

FIG. 1 is a block diagram showing one example of an image-shake correcting device.

The image-shake correcting device shown in FIG. 1 is arranged to cancel an image shake by optically displacing an optical axis. Specifically, if a vibration occurs in a photographic apparatus such as a still camera or a video camera, the vibration is detected by an angular-velocity detector 1 which includes an angular-velocity sensor, such as a vibration gyro, mounted in the photographic apparatus, and the angular-velocity detector 1 outputs a signal corresponding to the detected vibration. The DC component of the angular-velocity signal outputted from the angular-velocity detector 1 is cut off by a DC cutoff filter 2, and the obtained AC component, i.e., a vibration component, is passed through the DC cutoff filter 2. The DC cutoff filter 2 may use a high-pass filter (hereinafter referred to as "HPF") capable of cutting off an arbitrary band of a signal.

The angular-velocity signal outputted from the DC cutoff filter 2 is amplified to an appropriate sensitivity level by an amplifier 3, and the phase and the gain of the angular-velocity signal are corrected by a correction circuit 4 made up of an HPF and a high-frequency compensation filter. The output of the correction circuit 4 is integrated by an integrator 5, and an angular-displacement signal is inputted to an adder 6, in which the angular-displacement signal and a detected-position output are added together. In accordance with the sum outputted from the adder 6, a microcomputer (RCOM) 7 outputs to a driving circuit 8 an instruction to drive image correcting means (hereinafter referred to as "VAP" (variable angle prism)) 9, thereby driving the VAP 9.

In the meantime, a position of the VAP 9 is detected by a position detecting sensor 10 which monitors the position of the VAP 9, and the detected-position output of the position detecting sensor 10 is amplified by an amplifier 11. As described above, the amplified detected-position output is added to the output of the integrator 5 in the adder 6, and the sum outputted from the adder 6 is sent to the microcomputer 7 and the microcomputer 7 executes control of the VAP 9 in accordance with the inputted sum. In addition, an image-shake correcting switch 12 is provided for turning on or off the operation of the VAP 9. In accordance with the state of the image-shake correcting switch 12, a switch 13 is turned on or off, so that the operation of the VAP 9 is started or stopped.

An image-shake correcting operation which is performed by the VAP 9 and the driving circuit 8 will be described below. FIG. 2 is a schematic view showing the structure of the VAP 9.

As shown in FIG. 2, the VAP 9 includes two transparent parallel plates 740a and 740b which are opposed to each other, a transparent elastic material or inactive liquid 742 which has a high refractive index (n) and is charged into the gap between the transparent parallel plates 740a and 740b, and a sealing material 741, such as resin film, which surrounds and elastically seals the gap between the transparent parallel plates 740a and 740b so as to swingably hold the transparent parallel plates 740a and 740b. An image shake is corrected by swinging the transparent parallel plates 740a and 740b of the VAP 9 and displacing the optical axis thereof.

FIG. 3 is a schematic view showing the state of passage of an incident light flux through the VAP 9 shown in FIG. 2.

FIG. 3 is a schematic view showing the state of passage of an incident light flux 744 through the VAP 9 when the transparent parallel plate 740a is rotated by an angle σ about a swinging or rotating shaft 701 (711). The light flux 744 which is made incident on the VAP 9 along an optical axis 743 is made eccentric (deflected) by an angle φ on the same principle as a prism.

FIG. 4 is a schematic view showing the construction of a VAP driving mechanism.

FIG. 4 shows one example of the arrangement of the VAP 9 and the driving circuit 8. In this arrangement, a voice coil is used in a driving system, and feedback control is performed on the basis of an angular displacement detected by a position detecting sensor.

As shown in FIG. 4, the VAP 9 is secured to a lens barrel 702 via a holding frame 707 so that the VAP 9 can be turned about the axis of the rotating shafts 701 and 711. A coil 712, a yoke 713 and a magnet 715 constitute a voice-coil type actuator, which can vary the apex angle of the VAP 9 about the rotating shaft 711 by causing a current to flow in the coil 712.

A slit 710 for detecting the displacement of the VAP 9 is arranged to displace its position while turning concentrically to the rotating shaft 711 together with the holding frame 707, i.e., the VAP 9. The slit 710, a PSD (position detecting element) 709 and a light-emitting diode 708 constitute a position detecting sensor. In the position detecting sensor, light emitted from the light-emitting diode 708 is received by the PSD 709 to detect the displacement of the slit 710, thereby detecting the angular displacement of the apex angle of the VAP 9.

The light flux the incident angle of which has been varied by the VAP 9 in the above-described manner is focused on the image pickup surface of an image pickup element 704 by a photographic lens unit 703. Incidentally, reference numeral 705 denotes another rotating axis which is at right angles to the axis of the rotating shafts 701 and 711 of the holding frame 707.

FIG. 5 is a block diagram showing a control circuit for controlling the driving of the VAP 9.

In the feedback system of the control circuit shown in FIG. 5, a control signal 720 for image-shake correction is supplied from the microcomputer 7 to a voice-coil type of actuator 724 through an amplifier 722 and an driver 723 for driving the actuator 724. The driver 723 drives the actuator 724 in accordance with the control signal 720, so that the actuator 724 controls the VAP 9 to vary the apex angle thereof by a predetermined amount.

The angular displacement of the apex angle of the VAP 9 is detected by the position detecting sensor 10 made up of the PSD 709 and the associated constituent elements, and the detected-position output of the position detecting sensor 10 is supplied to an adder 725. In the adder 725, the detected-position output is added to the control signal 720 which is supplied from the microcomputer 7 and of opposite polarity to that of the detected-position output. The control system operates so that the control signal 720 for image-shake correction which is outputted from the microcomputer 7 and the output signal of the position detecting sensor 10 can become equal to each other. Accordingly, the VAP 9 is driven so that the control signal 720 can coincide with the output of the position detecting sensor 10, whereby the VAP 9 is controlled so as to take the position specified by the microcomputer 7.

However, the above-described example involves a number of problems. A first problem is that the switch 13 for turning on or off the operation of the VAP 9 is provided at the front stage of a vibration-frequency detecting block which includes the phase and gain correcting circuit 4 and the integrator 5 for generating a correction target value, so that when the switch 13 is off and the operation of the VAP 9 is off, it is impossible to detect a vibration frequency, and hence to make reference to vibration data relative to the camera.

A second problem is that, although the VAP 9 is normally controlled when in a steady state, if the VAP 9 is turned on or off, an image may be moved to a great extent while the VAP 9 is switching from its off state to its on state. This is because, during the off state, a control signal for the VAP 9 is not outputted to the driving circuit 8, while the microcomputer 7 performs a correction computation on the detection output of the angular-velocity detector 1 supplied from the phase and gain correcting circuit 4 and the integrator 5, so that the VAP 9 is moved to a great extent in accordance with the magnitude of a vibration obtained at the instant when the VAP 9 is turned on.

Contrarily, if the VAP 9 is switched from the on state to the off state while it is moving, the VAP 9 tends to immediately return toward the center of the optical axis by its own driving force, so that an image is greatly disturbed.

SUMMARY OF THE INVENTION

It is, therefore, a first object of the present invention to provide an image-shake correcting device capable of achieving optimum image-shake correction control irrespective of the state of the device.

A second object of the present invention is to provide an image-shake correcting device which employs a VAP and which is capable of achieving optimum control allowing for the characteristics of the VAP.

A third object of the present invention is to solve the first problem of the above-described image-shake correcting device using the VAP and to provide an image-shake correcting device capable of detecting a vibration frequency at all times and making reference to the vibration frequency even while the VAP is off.

To achieve the above objects, in accordance with one aspect of the present invention, there is provided an image-shake correcting device which comprises detecting means for detecting a vibration, correcting means for correcting a motion of an image due to the vibration, driving means for driving the correcting means, switching means for driving or stopping the driving means, generating means for generating a target value for the correcting means from an output signal of the detecting means, and controlling means for controlling the driving means by using a signal generated by the generating means, wherein the switching means is provided at a rear stage of the generating means.

In accordance with another aspect of the present invention, there is provided an image-shake correcting device which comprises detecting means for detecting a vibration, correcting means for correcting a motion of an image due to the vibration, driving means for driving the correcting means, generating means for generating a target value for the correcting means from an output signal of the detecting means, switching means for driving or stopping the driving means, controlling means for controlling the driving means by using a signal generated by the generating means, communication means for performing communication with automatic focus controlling means, and reference-making means for transmitting reference information to the automatic focus controlling means via the communication means.

In accordance with another aspect of the present invention, there is provided an image-shake correcting device in which the generating means determines a frequency and an amplitude of a detected-vibration signal provided by the detecting means and detects panning and tilting.

A fourth object of the present invention is to solve the second problem involved in the above-described related art and to provide an image-shake correcting device capable of preventing an image from being greatly disturbed by a great motion of an image-shake correcting system at the instant when the image-shake correcting device is turned on or off, thereby improving the quality of video images.

In accordance with another aspect of the present invention, there is provided an image-shake correcting device which comprises first detecting means for detecting a vibration, vibration correcting means for correcting a motion of an image due to the vibration, passband limiting means for limiting a passband of an output of the first detecting means, first generating means for generating a first amount of correction from an output of the passband limiting means, second detecting means for detecting a second amount of correction by which the motion is actually corrected by the vibration correcting means, switching means for controlling driving and stopping of the vibration correcting means, second generating means for generating a target value for the vibration correcting means from the first amount of correction and the second amount of correction, controlling means for controlling the vibration correcting means by using a signal generated by the second generating means, and passband varying means for varying a characteristic of the passband limiting means at the instant when the vibration correcting means is switched from a stopped state to a driven state by the switching means.

In accordance with another aspect of the present invention, there is provided an image-shake correcting device which comprises first detecting means for detecting a vibration, vibration correcting means for correcting a motion of an image due to the vibration, passband limiting means for limiting a passband of an output of the first detecting means, first generating means for generating a first amount of correction from an output of the passband limiting means, second detecting means for detecting a second amount of correction by which the motion is actually corrected by the vibration correcting means, switching means for driving and stopping the vibration correcting means, second generating means for generating a target value for the vibration correcting means from the first amount of correction and the second amount of correction, controlling means for controlling the vibration correcting means by using a signal generated by the second generating means, position detecting means for detecting a driving position of the vibration correcting means, passband varying means for varying a characteristic of the passband limiting means at the instant when the vibration correcting means is switched from a driven state to a stopped state by the switching means, and stopping means for confirming an output of the position detecting means and bringing the vibration correcting means to the stopped state.

In accordance with another aspect of the present invention, the passband varying means increases a cutoff frequency of the passband limiting means up to a predetermined value at the instant when the vibration correcting means is switched from the stopped state to the driven state by the switching means, and then gradually decreases the cutoff frequency to a steady value.

In accordance with another aspect of the present invention, the passband varying means increases a cutoff frequency of the passband limiting means on a step-by-step basis at the instant when the vibration correcting means is switched from the driven state to the stopped state by the switching means, and returns the cutoff frequency to a steady value after the vibration correcting means is stopped.

In accordance with another aspect of the present invention, the stopping means confirms through the position detecting means a return of the vibration correcting means to its central position after an initial variation of the characteristic of the passband limiting means by the passband varying means and brings the vibration correcting means to the stopped state.

In accordance with another aspect of the present invention, the position detecting means detects the driving position of the vibration correcting means from the first amount of correction generated by the first generating means.

In accordance with another aspect of the present invention, the position detecting means detects the driving position of the vibration correcting means from the second amount of correction.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 11 is a flowchart of processing executed in the third embodiment shown in FIG. 10;

FIG. 15 shows another subroutine of the central-position detecting processing shown in FIG. 13;

FIGS. 19(A) and 19(B) are views showing AF evaluation value inputting areas;

DETAILED DESCRIPTION OF THE PREFERRED EMBODIMENTS

Preferred embodiments of the present invention will be described below with reference to the accompanying drawings.

Figure 6:
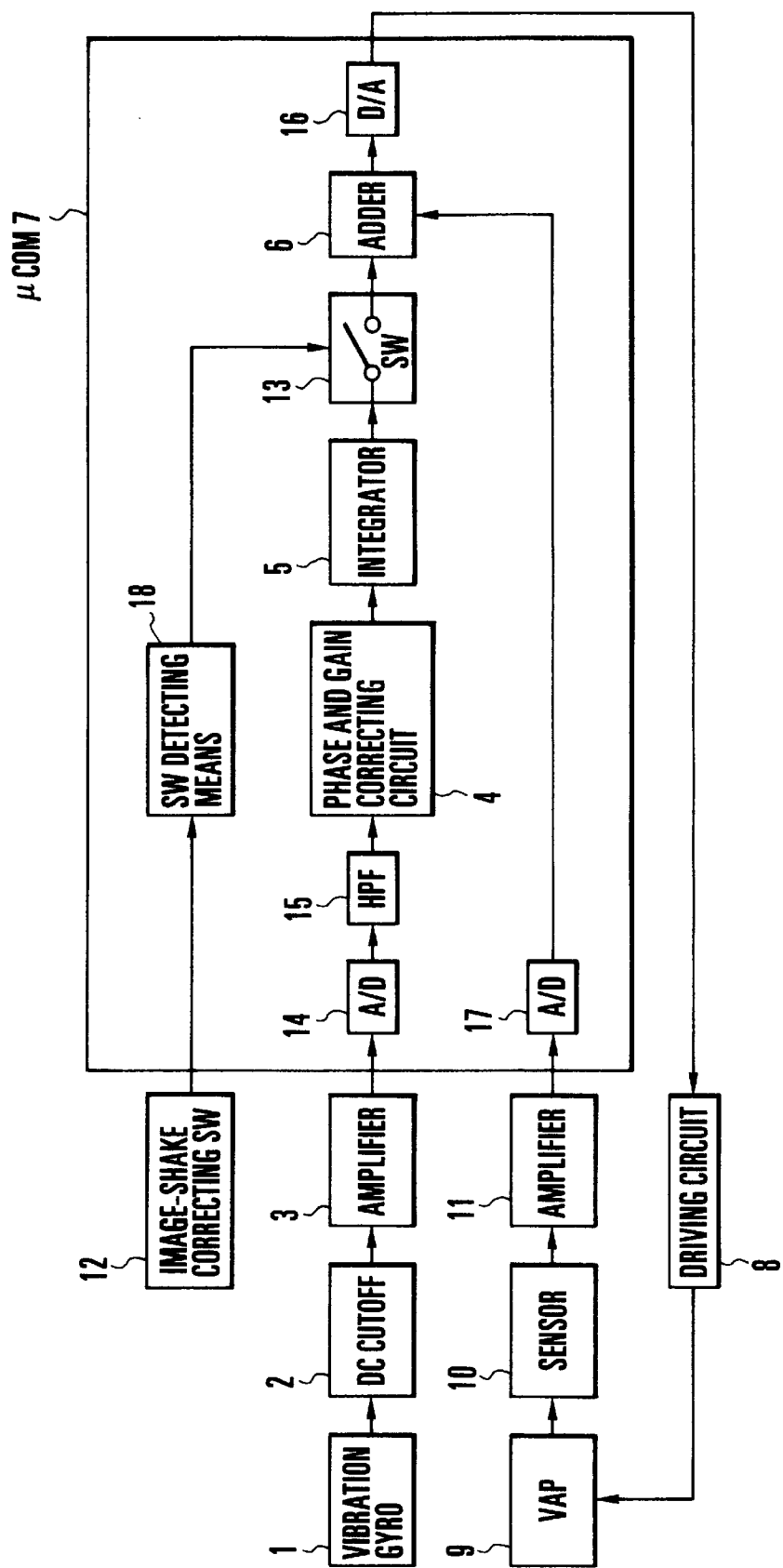
FIG. 6 is a block diagram showing the construction of a first embodiment of the present invention.

FIG. 6 is a block diagram showing the construction of an image-shake correcting device according to a first embodiment of the present invention.

In the image-shake correcting device shown in FIG. 6, the detected-vibration output of a vibration gyro 1 which is an analog value is amplified by an amplifier 3 and supplied to a microcomputer 7. In the microcomputer 7, the output of the amplifier 3 is A/D-converted by an A/D converter 14, and the DC component produced by the A/D converter 14 is cut off by an HPF 15. The output of the HPF 15 is inputted to an adder 6 by a switch circuit 13 provided at the rear stage of an integrator 5, and the digital signal outputted from the adder 6 is supplied to a D/A converter 16. The digital signal is converted into an analog value by the D/A converter 16, and the analog value is outputted to a VAP driving circuit 8 outside the microcomputer 7.

The detected-position output of a position detecting sensor 10 connected to a VAP 9 is amplified by an amplifier 11 and supplied to the microcomputer 7. In the microcomputer 7, the output of the amplifier 11 is A/D-converted by an A/D converter 17 and the detected-position signal is inputted to the adder 6 as a digital signal. A signal outputted from an image-shake correcting switch 12 is detected by switch detecting means 18 inside the microcomputer 7, and the switch circuit 13 is turned on or off by the switch detecting means 18.

As described above, according to the first embodiment, the microcomputer 7 includes the process line extending between the A/D converter 14 and the D/A converter 16, the A/D converter 17 and the switch detecting means 18, and the switch circuit 13 is located at the rear stage of the integrator 5.

Figure 1:
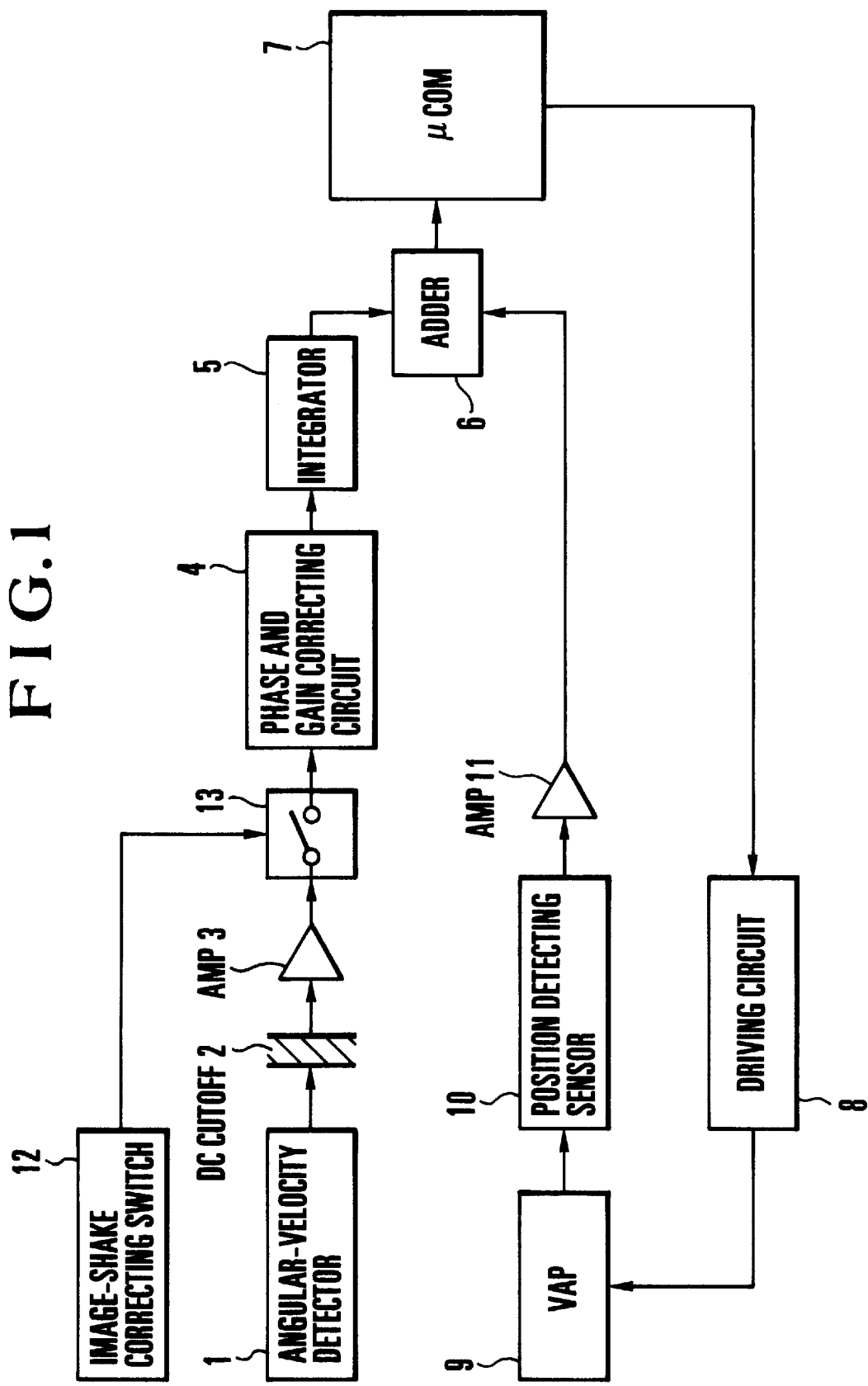
FIG. 1 is a block diagram schematically showing the construction of an image-shake correcting device according to a related art.
Figure 2:
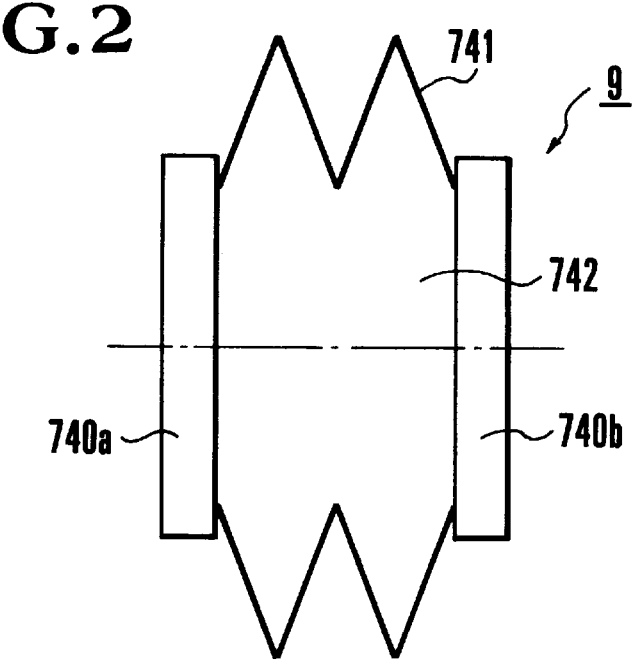
FIG. 2 is a schematic view showing the structure of the VAP shown in FIG. 1.
Figure 3:
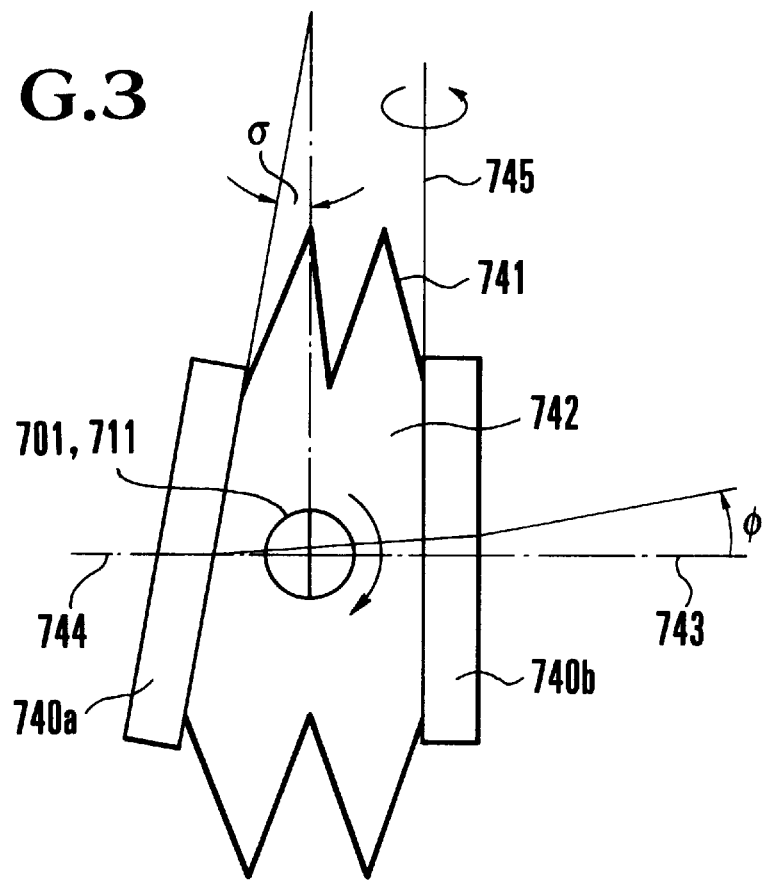
FIG. 3 is a schematic view showing the state of passage of incident light flux through the VAP shown in FIG. 2.
Figure 4:
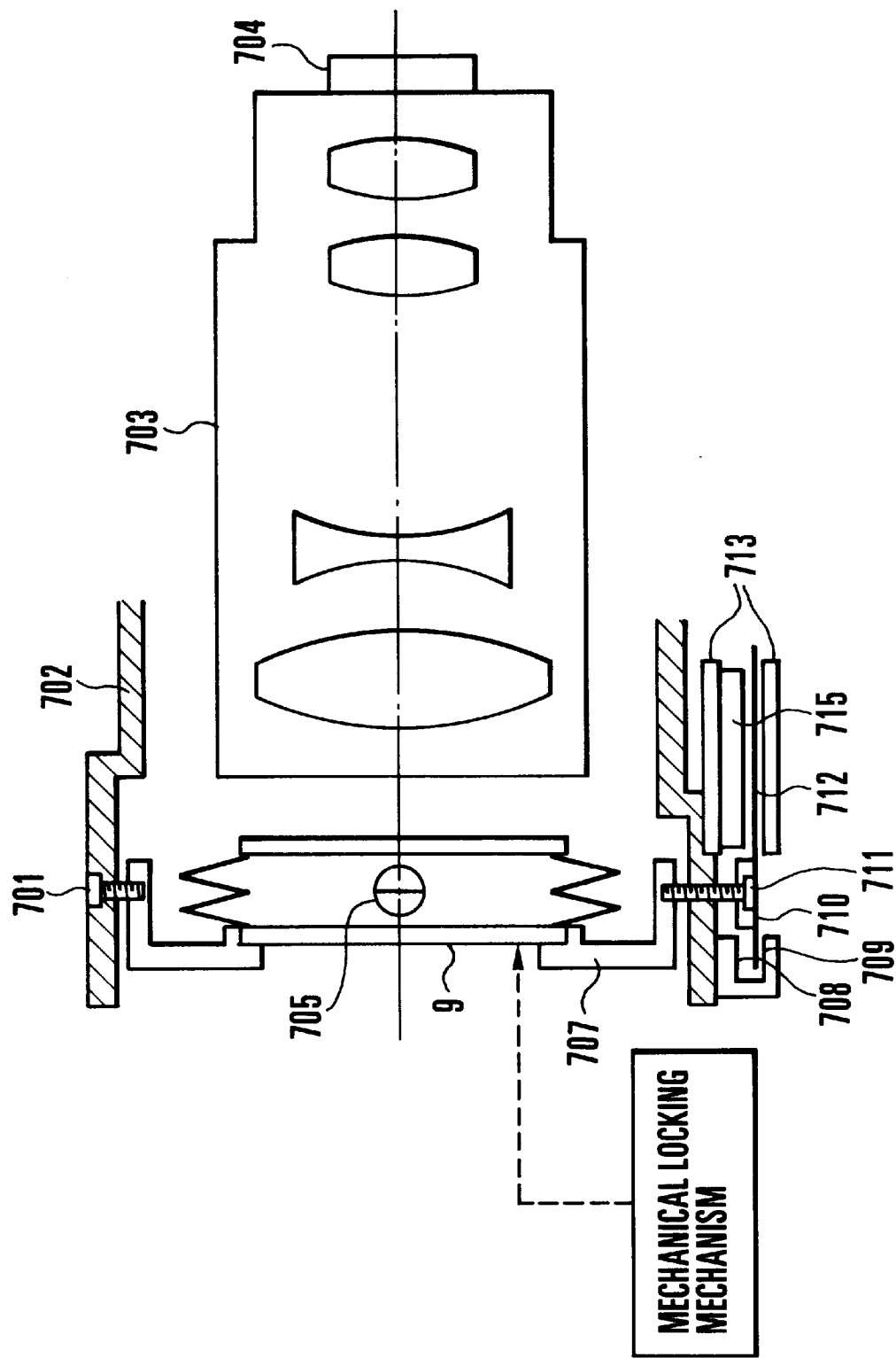
FIG. 4 is a schematic view showing the structure of a driving mechanism for the VAP shown in FIG. 1.
Figure 5:
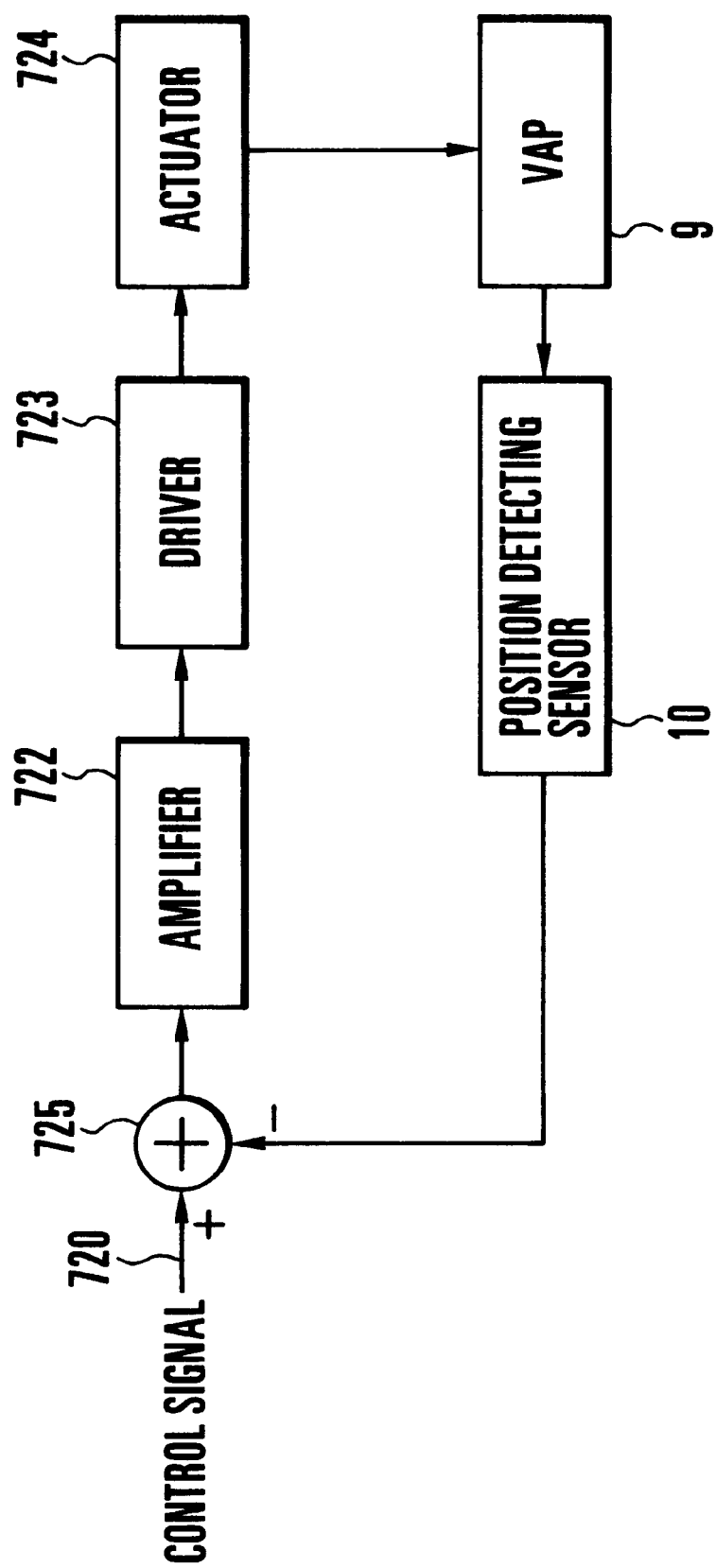
FIG. 5 is a block diagram showing a driving controlling circuit for the VAP shown in FIG. 1.

The arrangement of the other constituent elements is identical to the above-described arrangement shown in FIG. 1. In FIG. 6, identical reference numerals are used to denote constitute elements which are functionally identical to those shown in FIG. 1, and the description thereof is omitted for the sake of simplicity.

The operation of the image-shake correcting device shown in FIG. 6 will be described below.

If a vibration of a photographic apparatus is detected by the vibration gyro 1, the DC component of the angular-velocity output of the vibration gyro 1 is cut off by a DC cutoff filter 2, and the obtained angular-velocity signal is amplified by the amplifier 3. The analog output of the amplifier 3 is inputted to and converted into a digital value by the A/D converter 14 inside the microcomputer 7. The phase and the gain of the inputted angular-velocity signal are corrected by a phase and gain correcting circuit 4. The thus-corrected angular-velocity signal is integrated by the integrator 5, and the integrator 5 outputs an angular-velocity signal which serves as a correction target.

If the VAP 9 is to be stopped, the switch circuit 13 is turned off by the switch detecting means 18 (which detects the input state of the image-shake correcting switch 12 and produces an ON or OFF pulse in accordance with the detected input state), whereby the subsequent processing for the VAP 9 is stopped.

If the switch circuit 13 is turned on, the control of the VAP 9 is continued and the angular-velocity signal is inputted from the adder 6 to the D/A converter 16, in which the angular-velocity signal is converted into an analog value. The obtained analog signal is sent from the microcomputer 7 to the driving circuit 8 as a control signal for image-shake correction.

In accordance with the control signal from the microcomputer 7, for example a voice-coil type actuator is operated to vary the apex angle of the VAP 9 and displace the optical axis thereof, thereby correcting the influence of the vibration.

The angular displacement of the apex angle of the VAP 9 is detected by the position detecting sensor 10 which is made up of a PSD and the like and serves to monitor the position of the VAP 9. The detected-position output of the position detecting sensor 10 is amplified by the amplifier 11 and is converted into a digital value by the A/D converter 17 inside the microcomputer 7. In the microcomputer 7, the digital value is inputted to the adder 6, and the adder 6 adds the angular-displacement signal obtained from the vibration gyro 1 to the digital value which is of opposite polarity to that of the angular-displacement signal. A control signal is outputted from the D/A converter 16 to the driving circuit 8 as a feedback value until the sum output of the adder 6 reaches zero.

When the control of the VAP 9 is completed and the VAP 9 takes the image-shake correcting position specified by the microcomputer 7, the incident light flux deflected by the VAP 9 is focused on a CCD by a photographic lens unit, whereby a sharp image signal free of an image shake is supplied to a video signal processing circuit or an AF circuit which follows the CCD.

As described above, in the first embodiment, the position at which to actually shut off the signal supplied from the vibration gyro 1 (the position at which the switch circuit 13 is disposed) follows the integrator 5 unlike the related-art example described previously. Accordingly, so far as a power source is not turned off, the signal outputted from the vibration gyro 1 can be inputted into the microcomputer 7 at all times, and since the microcomputer 7 functions even if an image-shake correcting mechanism is off, the vibration frequency of the vibration gyro 1 can be detected at all times. Accordingly, even another system placed under control of a different control system can make reference to and make use of vibration-frequency data, and it is possible to solve an operational problem which may be induced by the different control system.

In addition, since the aforesaid data processing system is arranged in the microcomputer 7, the overall reliability of the image-shake correcting device can be improved. Of course, it is also possible to arrange the data processing system outside the microcomputer 7 for reasons of the limitations of the capacity of the microcomputer 7 and the like, as in the case of the related-art examples.

A second embodiment of the present invention will be described below.

Figure 7:
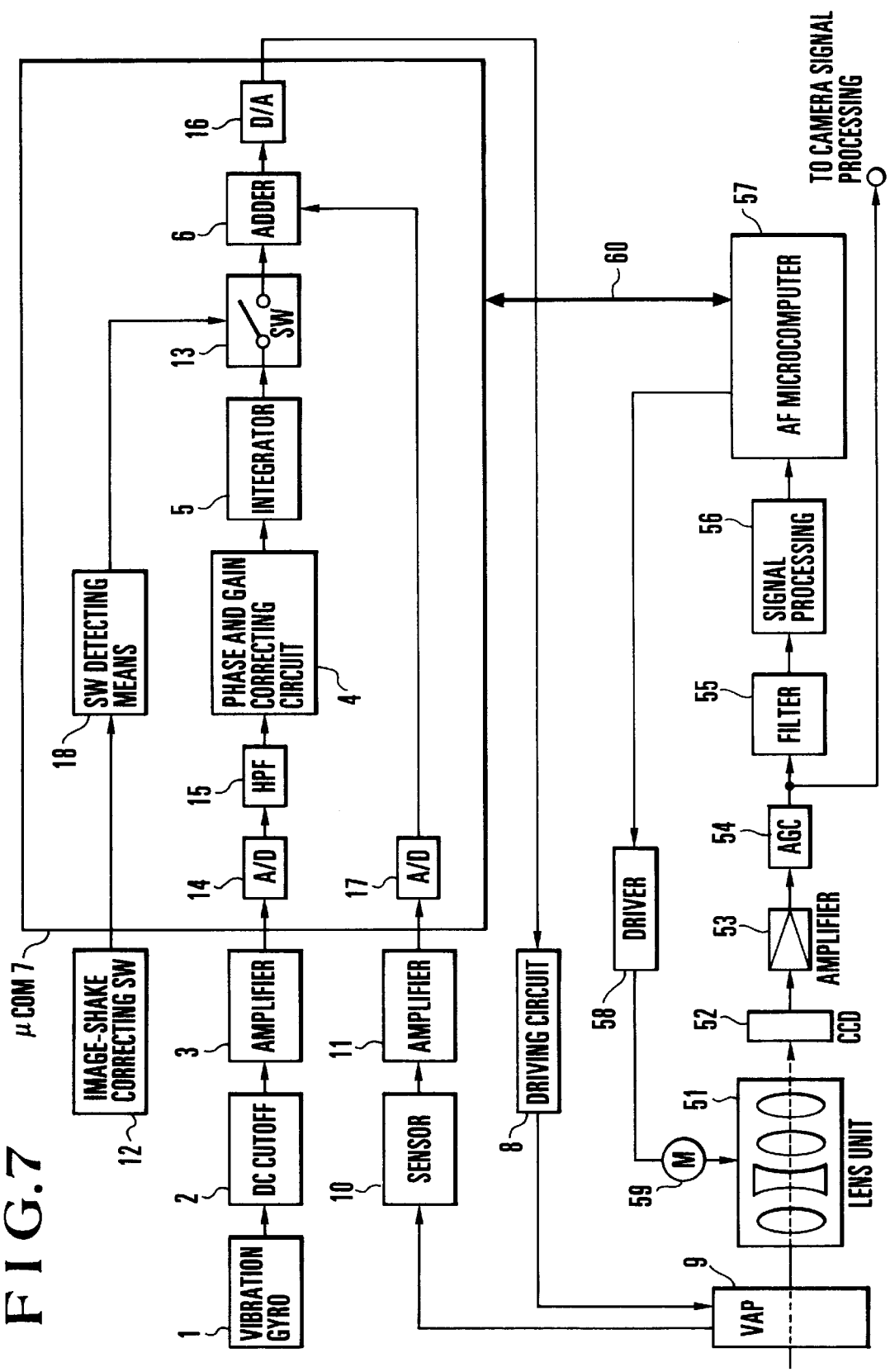
FIG. 7 is a block diagram showing the construction of a second embodiment of the present invention.

FIG. 7 is a block diagram showing the construction of an image-shake correcting device according to a second embodiment of the present invention.

The second embodiment shown in FIG. 7 is an example in which panning information obtainable from the VAP 9 is applied to autofocus (AF) driving.

Since the image-shake correcting device according to the second embodiment is identical in construction to the above-described one according to the first embodiment, identical reference numerals are used to denote constituent elements identical to those used in the first embodiment and the description thereof is omitted for the sake of simplicity.

When a subject is photographed by a photographic apparatus, an image of the subject is focused on a CCD 52 via the VAP 9 by a lens unit 51. An image signal outputted from the CCD 52 is amplified by an amplifier 53, and the output of the amplifier 53 is subjected to known automatic gain control in an automatic gain control circuit 54. The thus-obtained video signal is outputted to a camera signal processing circuit which follows the automatic gain control circuit 54. The output of the automatic gain control circuit 54 is also supplied to a filter 55, in which its high-frequency component is extracted. A signal processing circuit 56 produces a sharpness signal for use in AF from the output of the filter 55, and inputs the sharpness signal to an AF microcomputer 57 for autofocus control.

The AF microcomputer 57 makes a determination as to the sharpness signal and sends an AF control signal to a driver 58. The driver 58 drives a lens driving motor 59 to move a focusing lens forward or rearward, thereby performing AF control. The AF microcomputer 57 obtains data indicative of the state of panning or tilting from the VAP microcomputer ($\mu$COM) 7 via a communication line 60.

Figure 8:
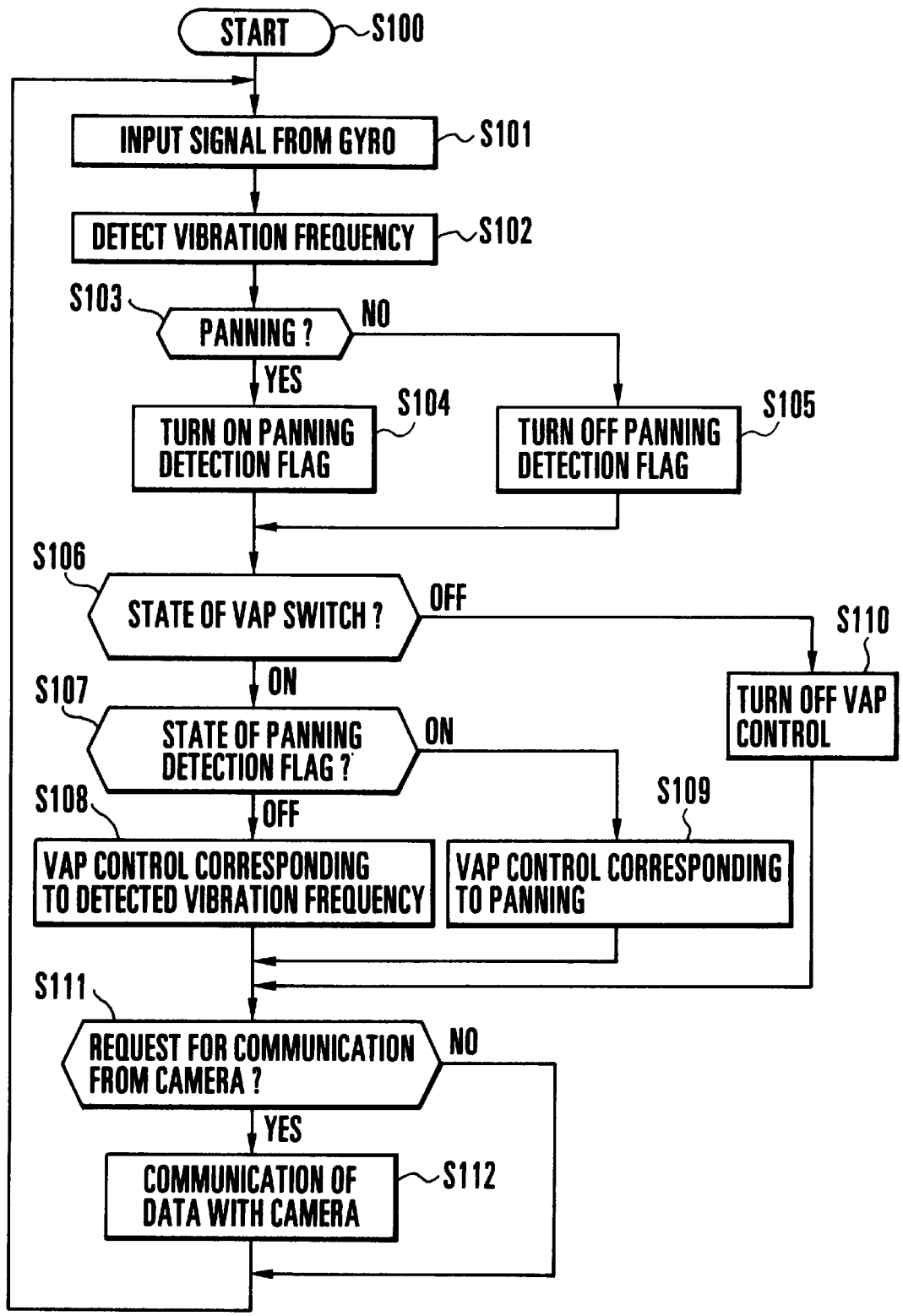
FIG. 8 is a flowchart of processing executed in the second embodiment of the present invention.

FIG. 8 is a flowchart of processing according to the second embodiment shown in FIG. 7.

The operation of the second embodiment will be described below with reference to FIG. 8.

When the process is started (S100), the detected-position signal outputted from the vibration gyro 1 is A/D-converted by the A/D converter 14 and the obtained digital signal is inputted to the microcomputer 7 (S101).

Correction-target-value generating means which is formed by the phase and gain correcting circuit 4, the integrator 5 and the microcomputer 7 detects the current vibration frequency from the signal inputted from the vibration gyro 1 (S102).

The generating means determines whether the photographic apparatus, such as a still camera or a video camera, is being panned, on the basis of the frequency and the amplitude value of the detected vibration (S103).

If it is determined that the photographic apparatus is being panned, a panning detection flag is turned on (S104).

If it is determined in Step S103 that the photographic apparatus is not being panned, the panning detection flag is turned off (S105).

The state of the image-shake correcting switch 12 is detected by the switch detecting means 18 (S106).

If the image-shake correcting switch 12 is on, the panning detection flag is checked (S107).

If the panning detection flag is off, the cutoff frequency of each of the phase and gain correcting circuit 4 and the integrator 5 is varied in accordance with the vibration frequency detected in Step S102, and the VAP 9 is controlled according to the detected vibration frequency (S108).

If the panning detection flag is on, the VAP 9 is controlled according to the current panning (S109).

If the image-shake correcting switch 12 is off in Step S106, the switch circuit 13 is turned off and the control of the VAP 9 is cancelled (S110).

It is then determined whether a request for communication has been made by the AF microcomputer 57 (S111).

If there is a request for communication, a communication is performed between the AF microcomputer 57 and the microcomputer 7 associated with the VAP 9 (S112). The contents communicated between them include panning information and tilting information. For example, if the panning information transmitted from the microcomputer 7 indicates that the photographic apparatus is being panned, the AF microcomputer 57 sends to the driver 58 an instruction to stop driving the focusing lens, on the basis of such panning information. Accordingly, it is possible to prevent focus from fluctuating owing to variations of the sharpness signal due to panning. In the case of tilting as well, if its vibration frequency is large, processing similar to the above-described processing for panning is performed.

In the above-described second embodiment, the operations which are performed in Steps S111 and S112 via the communication line 60 by the AF microcomputer 57 and the microcomputer 7 correspond to communication means. The processing of Step S103 corresponds to the panning detecting operation performed by the generating means. The operation of processing the contents (such as panning information) communicated in Steps S111 and S112 corresponds to the operation of reference-making means.

As described above, according to the second embodiment, since detection of the vibration frequency is performed at all times, it is also possible to perform detection of panning or the like at all times. With the thus-obtained information, it is also possible to effect more accurate focusing during AF control, whereby more efficient AF control can be achieved.

Although the above description has referred to an image-shake correcting system for a video camera by way of example, the present invention is not limited to video cameras and can, of course, be applied to any type of apparatus which has a gyro for correcting an image shake.

As described above, according to the first embodiment, in an image-shake correcting device for a photographic apparatus, switching means for turning on or off the image-shake correcting device is disposed at the rear stage of generating means for generating a correction target value from a detected-vibration signal. Accordingly, it is possible to detect a vibration frequency at all times even if the switching means for the image-shake correcting device is turned off during photography.

According to the second embodiment, there is an arrangement which includes, in addition to the constituent elements used in the first embodiment, communication means for enabling communication with AF control means and reference-making means for transmitting reference information, such as panning information, to the AF control means via the communication means. Accordingly, the AF control means can make reference to the reference information, such as panning information, at all times, so that photographers can use more improved photographic techniques.

A third embodiment of the present invention will be described below.

Figure 9:
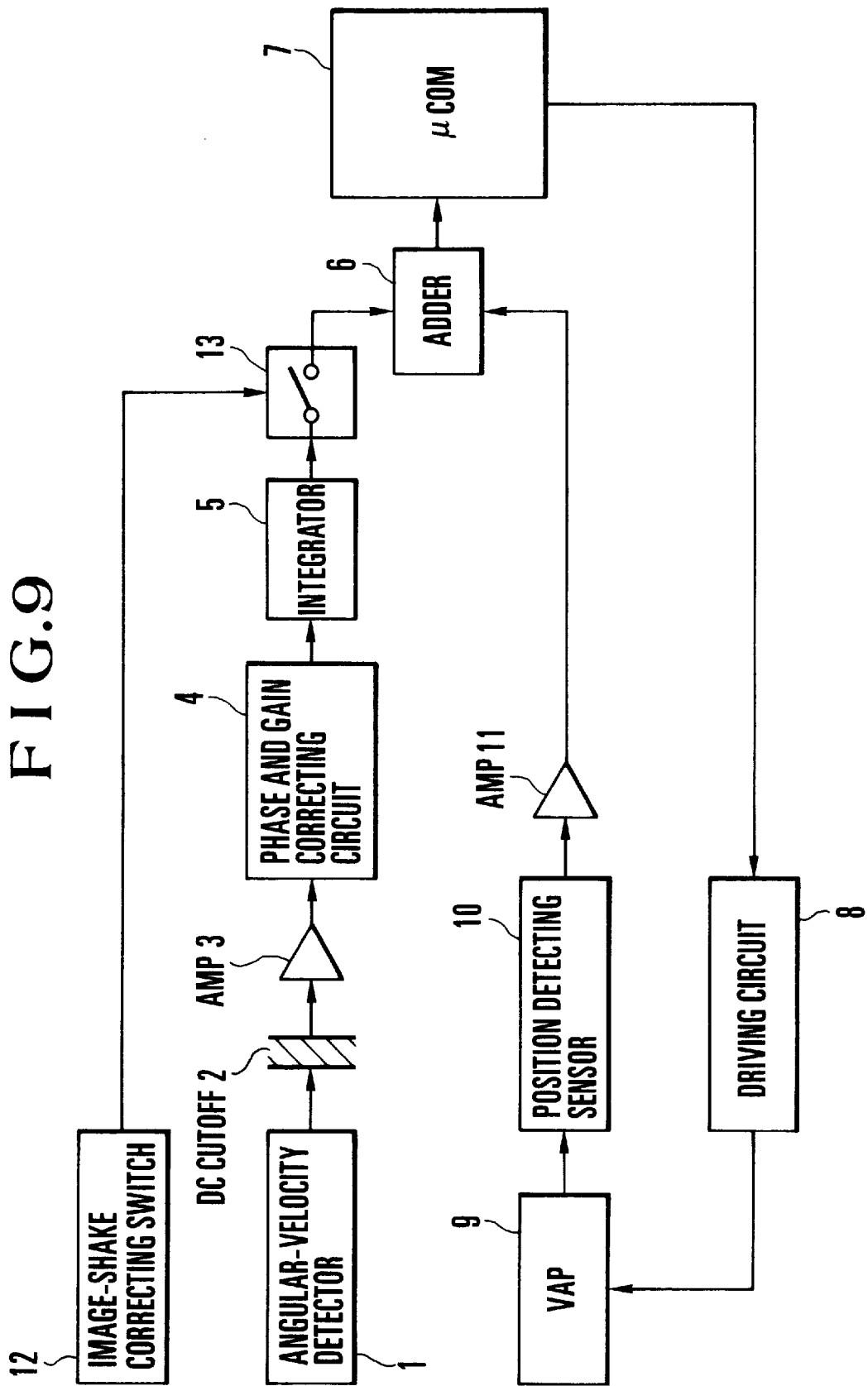
FIG. 9 is a block diagram showing the construction of an image-shake correcting system according to the first embodiment of the present invention.

FIG. 9 is a conceptual diagram showing the above-described image-shake correcting device according to the first embodiment of the present invention. The feature of the first embodiment is that the switch 13 for turning on or off the VAP 9 is provided at the rear stage of the integrator 5. According to the first embodiment, even while an image-shake correcting operation is not being performed, it is possible to detect an image shake and use the detected image shake for the purpose of control such as AF control.

The third embodiment which will be describe below is intended to improve the characteristics of the first and second embodiments and, more specifically, to prevent an unnatural motion from occurring in an image when a VAP is turned on or off.

Figure 10:
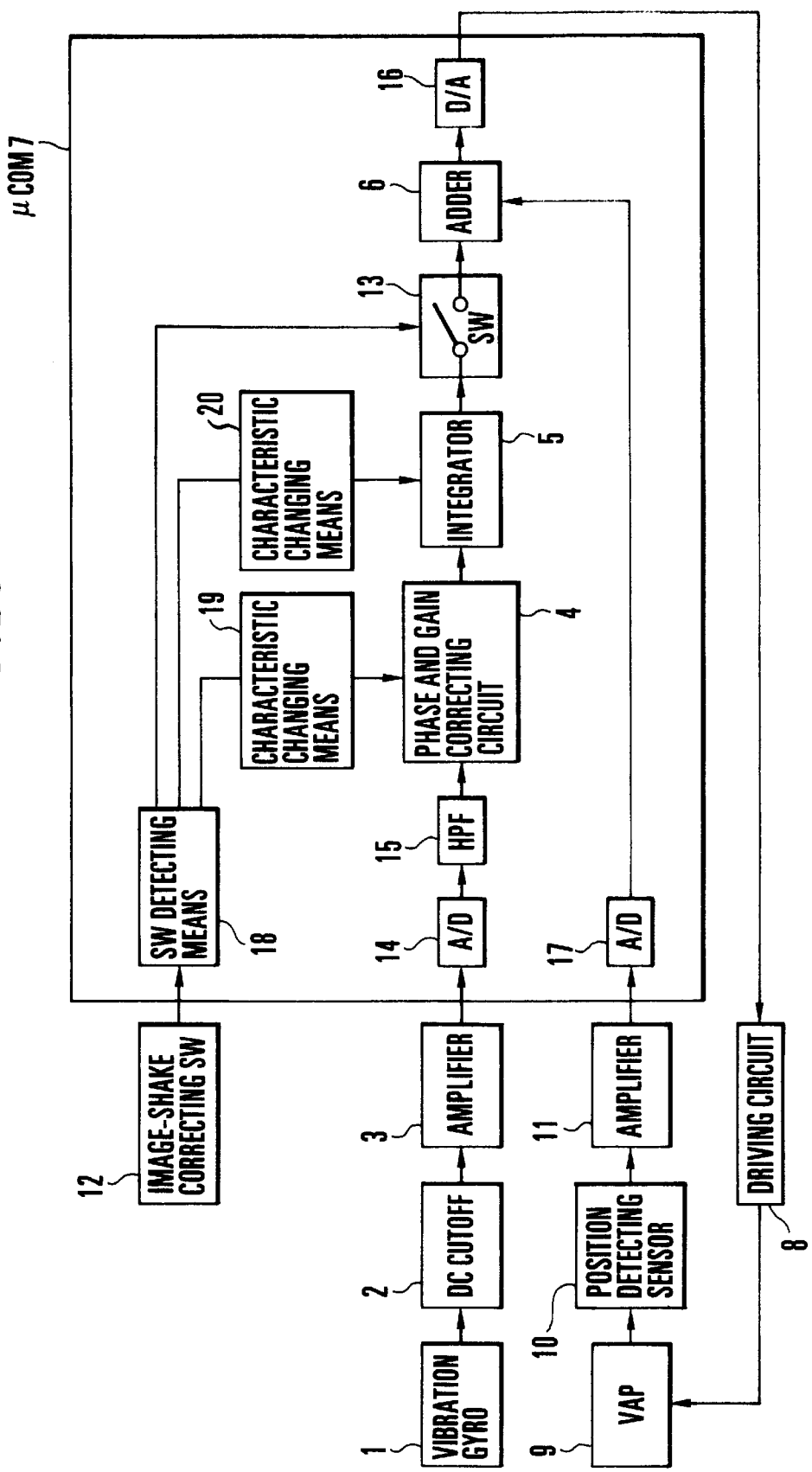
FIG. 10 is a block diagram showing the construction of an image-shake correcting device according to a third embodiment of the present invention.

FIG. 10 is a block diagram showing an image-shake correcting device according to the third embodiment of the present invention. In the image-shake correcting device shown in FIG. 10, the detected-vibration output of the vibration gyro 1 which is an analog value is amplified by the amplifier 3 and supplied to the microcomputer ($\mu$COM) 7. In the microcomputer 7, the output of the amplifier 3 is A/D-converted by the A/D converter 14, and the DC component produced by the A/D converter 14 is cut off by the HPF 15. An angular-displacement signal is computed from the digital output of the HPF 15 by the phase and gain correcting circuit 4 and the integrator 5, and is inputted to the adder 6 via the switch circuit 13. The digital signal outputted from the adder 6 is converted into an analog value by the D/A converter 16, and the analog value is outputted to the VAP driving circuit 8 outside the microcomputer 7.

The detected-position output of the position detecting sensor 10 connected to the VAP 9 is amplified by the amplifier 11 and supplied to the microcomputer 7. In the microcomputer 7, the output of the amplifier 11 is A/D-converted by the A/D converter 17 and the detected-position signal is inputted to the adder 6 as a digital signal. A signal outputted from the image-shake correcting switch 12 is detected by the switch detecting means 18 inside the microcomputer 7, and the switch circuit 13 is turned on or off by the switch detecting means 18. If the image-shake correcting switch 12 is switched from one state to another, the switch detecting means 18 provided in the microcomputer 7 detects the switching of the image-shake correcting switch 12 and the cutoff frequency of each of the phase and gain correcting circuit 4 and the integrator 5 is changed to an appropriate value by the corresponding one of characteristic changing means 19 and 20, whereby on/off control of the VAP 9 is executed. Thus, the changing means 19 and 20 change the cut-off frequency response characteristics of the gain correcting circuit 4 and the integrator 5.

As described above, in the third embodiment, the A/D converter 14, the phase and gain correcting circuit 4, the process line extending between the integrator 5 and the D/A converter 16, the vibration gyro 1, the switch detecting means 18 and the characteristic changing means 19 and 20 are realized by the program provided in the microcomputer 7.

In FIG. 10, identical reference numerals are used to denote constitute elements which are identical to those shown in each of the figures referred to above, and the description thereof is omitted for the sake of simplicity.

FIG. 11 is a flowchart of processing according to the third embodiment shown in FIG. 10 The operation of the third embodiment will be described below.

FIG. 11 shows a subroutine to be performed when the VAP 9 is switched from its off state to its on state, and this subroutine constitutes part of the entire control of the VAP 9. If the VAP 9 is in the off state or an off→on switching flag which will be described later is on, the processing of FIG. 11 is repeated at intervals of a predetermined time period.

In a process to be performed when the VAP 9 is switched from the off state to the on state, it is first determined whether the off→on switching flag has been set (S201).

If the off→on switching flag has not been set, the state of the image-shake correcting switch 12 is inputted into the microcomputer 7 (S202).

It is determined whether the image-shake correcting switch 12 has been turned on, and if the image-shake correcting switch 12 is off, this subroutine is brought to an end (S203).

If the image-shake correcting switch 12 is on in Step S203, it is determined that the image-shake correcting switch 12 was first turned on at this time, and the cutoff frequency of each of the phase and gain correcting circuit 4 and the integrator 5 is shifted to a predetermined high frequency by the corresponding one of the characteristic changing means 19 and 20 (S204). (For example, if a vibration has a passband of approximately 1 to 12 Hz, the cutoff frequency is varied to a higher-frequency side of approximately 10 Hz. This numerical value is determined, as by experiment.)

Then, the switch circuit 13 is turned on and the control of the VAP 9 is executed. However, since the cutoff frequency of each of the phase and gain correcting circuit 4 and the integrator 5 has been made higher, the output of the vibration gyro 1 is limited so that the VAP 9 is prevented from being driven to a great extent (S205).

The off Won switching flag is set and the subroutine is brought to an end (S206).

If it is determined in Step S201 that the off→on switching flag has been set, this indicates that the VAP 9 is being switched from the off state to the on state. Accordingly, the cutoff frequency of each of the phase and gain correcting circuit 4 and the integrator 5 is decreased from its predetermined value by one step (S207). This one step corresponds to a value which is sufficiently smaller than the amount in which the cutoff frequency is first shifted. It is to be noted that such one step is set so that the cutoff frequency can be shifted in units of 5 Hz in a high-frequency range or by an extremely fine step, such as 5 mHz, in a low-frequency range which does not exceed several hertz. Then, it is determined that the current cutoff frequency has reached a steady value (S208). This steady value indicates a cutoff frequency to be used for controlling the VAP 9 in a normal state. For example, if a passband, i.e, a vibration frequency range over which image-shake correction is possible, is 1 to 12 Hz or the like, the steady value represents a cutoff frequency corresponding to such passband.

If the cutoff frequency has not yet reached the steady value, the subroutine is brought to an end. Subsequently, the processing of Steps S207 and S208 is repeated, and if the cutoff frequency reaches the steady value, the off→on switching flag is cleared and the on/off control subroutine is brought to an end and the process proceeds to the normal control of the VAP 9 (S209).

As is apparent from the above description, according to the third embodiment, the VAP 9 is restrained from making a transient abnormal motion when the control of the VAP 9 is started, whereby the quality of an image can be retained.

In addition, since the aforesaid data processing system is arranged in the microcomputer 7, the overall reliability of the image-shake correcting device can be improved. Of course, it is possible to arrange the data processing system outside the microcomputer 7 for reasons of component packaging or the limitations of the capacity of the microcomputer 7.

A fourth embodiment of the present invention will be described below.

Figure 12:
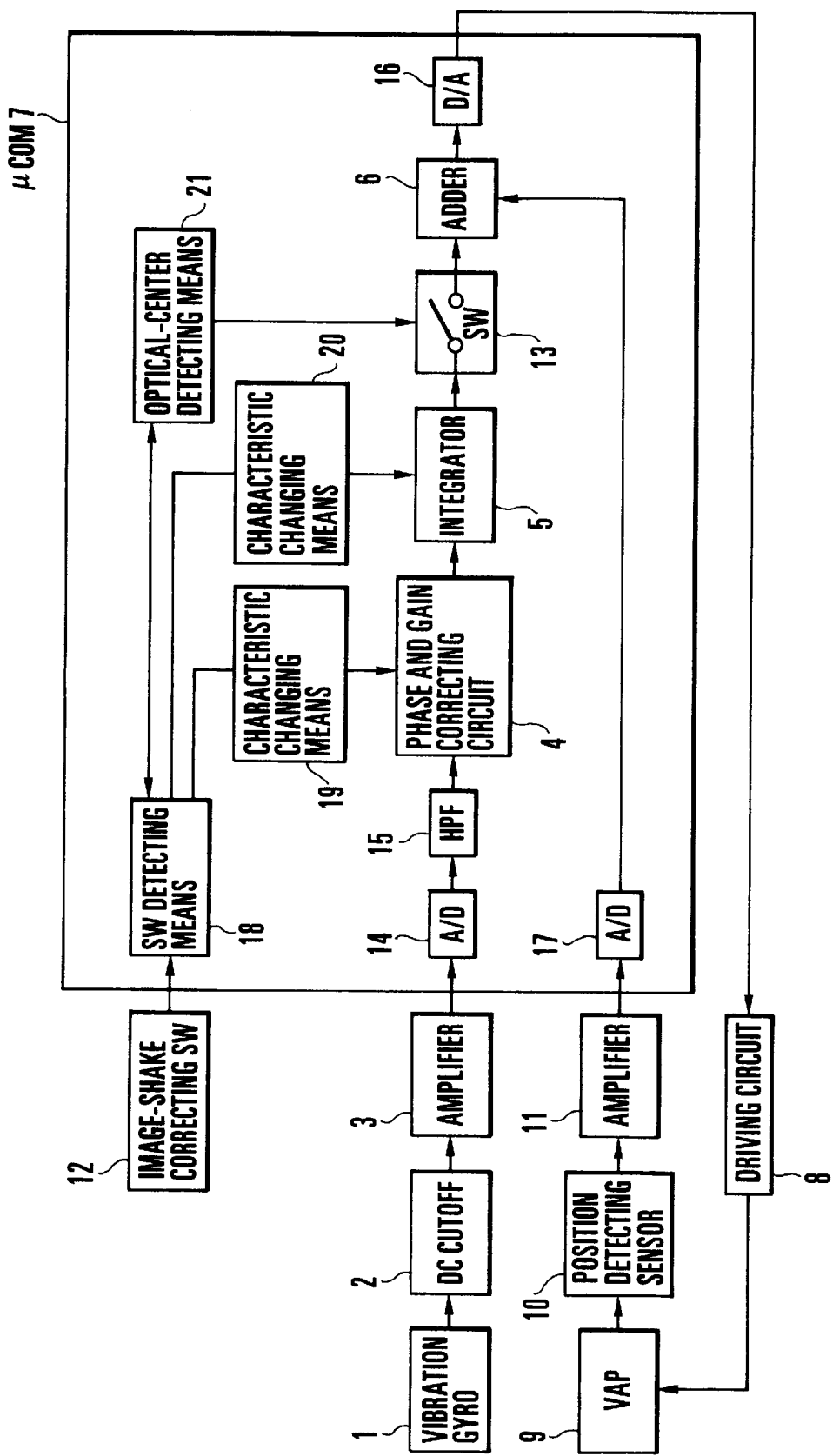
FIG. 12 is a block diagram showing the construction of an image-shake correcting device according to a fourth embodiment of the present invention.

FIG. 12 is a block diagram showing the construction of an image-shake correcting device according to the fourth embodiment of the present invention.

The fourth embodiment shown in FIG. 12 differs from the third embodiment in that optical-center detecting means 21 for determining whether the current position of the VAP 9 is a central position is newly added, and the optical-center detecting means 21 is formed by software in the microcomputer 7.

Since the other constituent elements are identical to those of the third embodiment, identical reference numerals are used to denote the identical constituent elements and the description thereof is omitted for the sake of simplicity.

Figure 13:
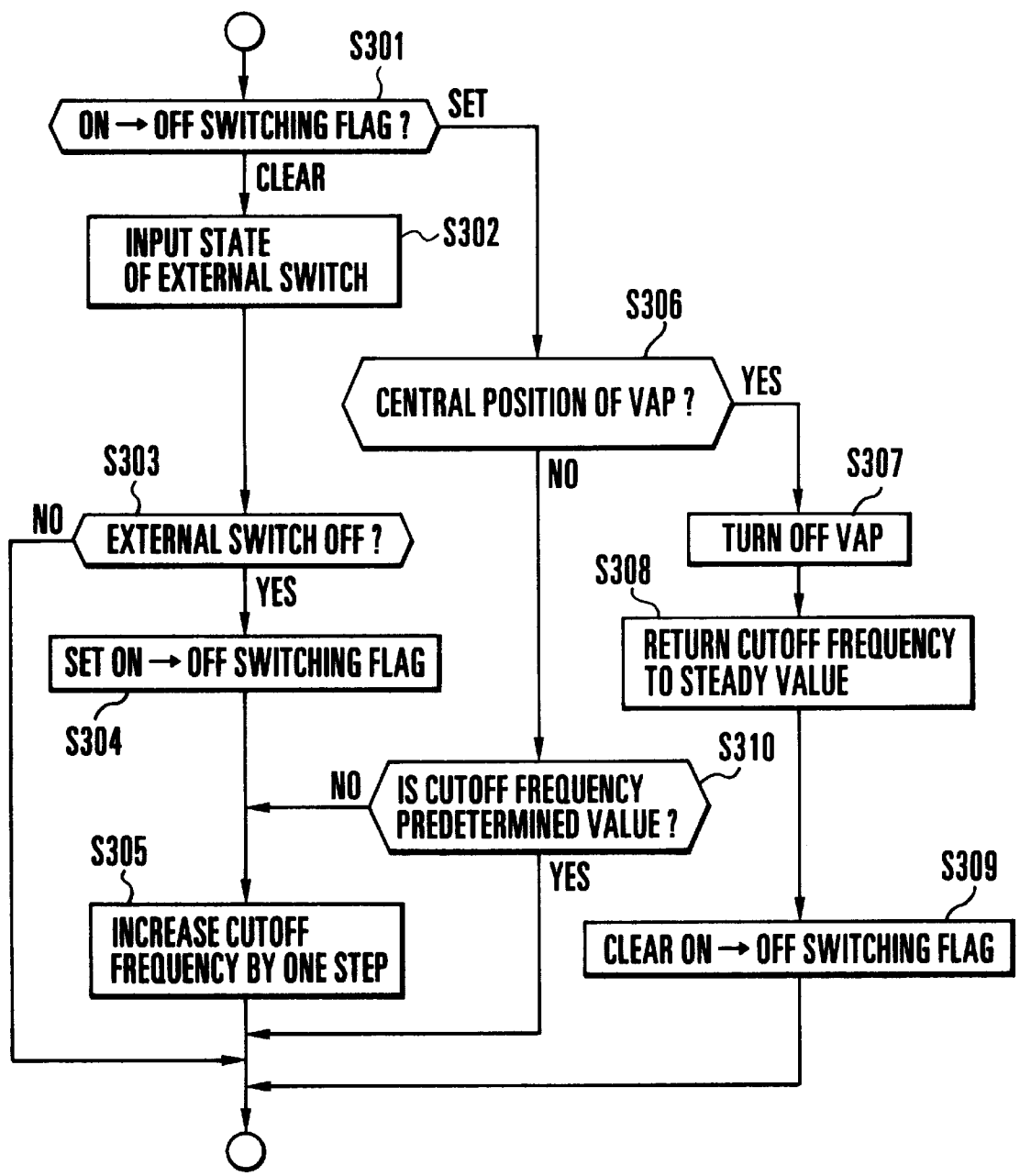
FIG. 13 is a flowchart of processing executed in the fourth embodiment shown in FIG. 12.

FIG. 13 is a flowchart of processing according to the fourth embodiment shown in FIG. 12.

The operation of the fourth embodiment will be described below with reference to FIG. 13.

The shown flowchart is a subroutine for switching the VAP 9 from the on state to the off state, which subroutine constitutes part of the entire VAP controlling program, and the processing shown in FIG. 13 is repeated at intervals of a predetermined time period.

First, it is determined whether an on→off switching flag has been set (S301).

If the on→off switching flag has not been set, the state of the image-shake correcting switch 12 is inputted into the microcomputer 7 (S302).

It is determined whether the image-shake correcting switch 12 has been turned off (S303).

If the image-shake correcting switch 12 is still on, the subroutine is brought to an end.

If the image-shake correcting switch 12 is off, the on→off switching flag is set (S304).

The cutoff frequency of each of the phase and gain correcting circuit 4 and the integrator 5 is increased by one step (S305). The amount of shifting for this one step may be similar to that described previously in connection with the third embodiment. Thus, the subroutine is brought to an end.

If it is determined in Step S301 that the on→off switching flag has been set, it is determined whether the current position of the VAP 9 is the central position (S306).

The fact that the process has proceeded to Step S306 means that the process is preparing to turn off the VAP controlling operation and the cutoff frequency has started to increase from the steady value. If the cutoff frequency increases, the output of the vibration gyro 1 is limited and the microcomputer 7 determines that no large vibration has occurred. Accordingly, the VAP 9 is gradually shifted toward its optical center.

Figure 14:
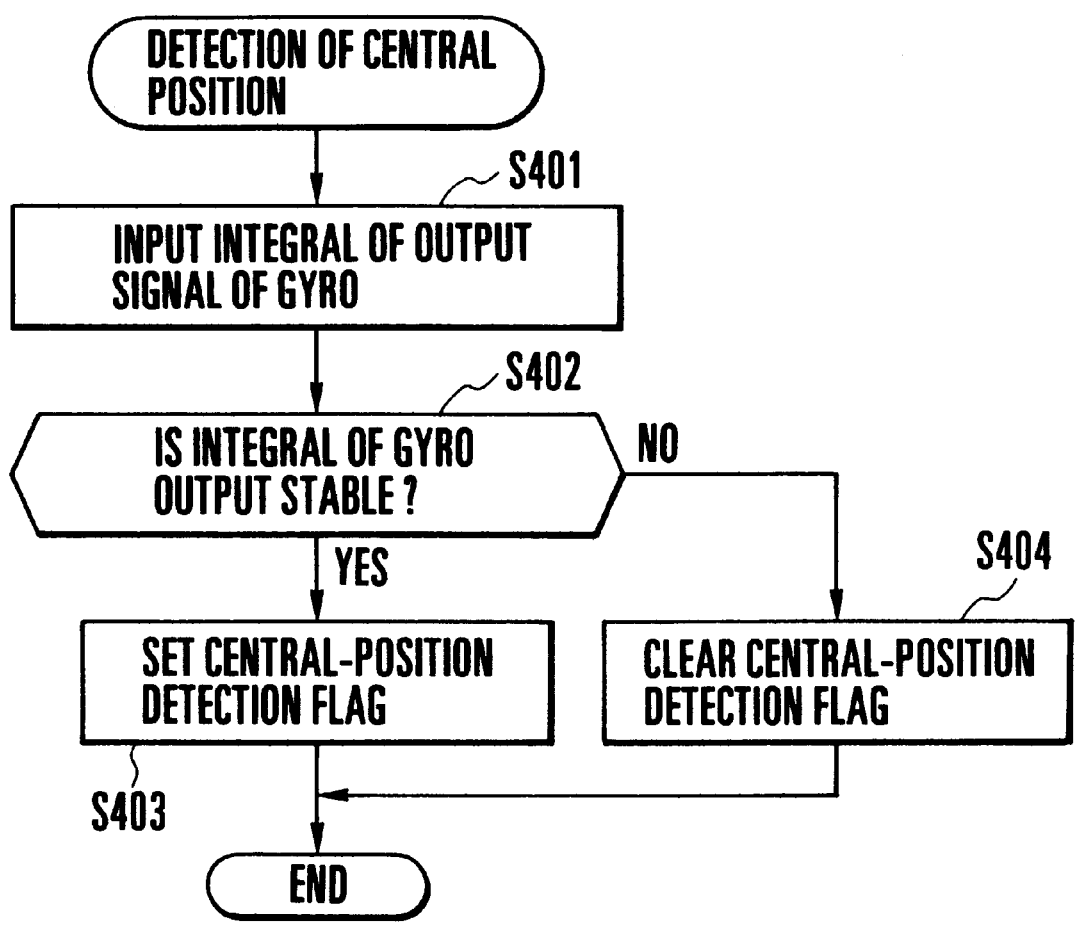
FIG. 14 shows a subroutine of the central-position detecting processing shown in FIG. 13.

FIG. 14 is a flowchart of the processing of detecting the central position from the output of the integrator 5.

The operation of the optical-center detecting means 21 to detect from the output of the integrator 5 whether the current position of the VAP 9 is the central position will be described below the flowchart shown in FIG. 14.

First, an angular-velocity signal outputted from the integrator 5 is inputted into the optical-center detecting means 21 (S401) and the inputted angular-velocity signal is within a range corresponding to the central position (S402).

If it is not within such range, a central-position detection flag is cleared and it is determined that the current position of the VAP 9 is not the central position (S404).

If the inputted angular-velocity signal is within the range, the central-position detection flag is set and it is determined that the current position of the VAP 9 is the central position (S403).

Incidentally, in the aforesaid process of determining whether the current position of the VAP 9 is the central position, since the cutoff frequency is shifted to the high-frequency side, the output of the integrator 5 is stabilized. Accordingly, since a target value for use in driving the VAP 9 is also stabilized, it is possible to determine the central position of the VAP 9 from the output state of the integrator 5.

FIG. 15 is a flowchart of the processing of detecting the central position from the output of the position detecting sensor 10.

The operation of detecting from the output of the position detecting sensor 10 whether the current position of the VAP 9 is the central position will be described below with reference to the flowchart shown in FIG. 15.

First, a feedback signal outputted from the position detecting sensor 10 is inputted into the optical-center detecting means 21 through the A/D converter 17 (S501).

It is determined whether the inputted signal of the position detecting sensor 10 (the PSD 709) is within a range corresponding to the central position (S502).

If it is not within such range, the central-position detection flag is cleared and it is determined that the current position of the VAP 9 is not the central position (S504).

If the inputted angular-velocity signal is within the range, the central-position detection flag is set and it is determined that the current position of the VAP 9 is the central position (S506).

Although two methods for making a determination as to the central position have been described, these two methods may be combined so that, only when the output signals of both the integrator 5 and the position detecting sensor 10 indicate the central position, it can be determined that the current position of the VAP 9 is the central position.

Returning back to FIG. 13, in Step S306, a determination as to the central position is made in any of the above-described methods. If it is determined that the current position of the VAP 9 is not the central position, it is then determined whether the cutoff frequency has reached a predetermined value (upper limit value) (S310).

If the cutoff frequency has not yet reached the predetermined value, the cutoff frequency is further increased by one step (S305).

If the cutoff frequency has reached the predetermined value, the subroutine is brought to an end and the process waits for the VAP 9 to return to the central position.

If it is determined in Step S306 that the current position of the VAP 9 is the central position, the switch circuit 13 is turned off and the VAP controlling operation is actually turned off (S307). The cutoff frequency is returned to the steady value (S308).

This processing is performed so that even if the VAP controlling operation is turned off, a vibration frequency can be detected at all times as reference data which is available to the operation of another control system (such as AF (autofocus) control system).

Finally, the on→off switching flag is cleared and the control of the VAP 9 is stopped (S309).

In the above-described fourth embodiment, the processing operations of Steps S305, S308 and S309 which include the operations of the characteristic changing means 19 and 20 correspond to the operation of passband varying means, the processing of Step S307 in which the VAP 9 is stopped by the switch circuit 13 on the basis the result of the determination made in Step S306 corresponds to the operation of stopping means, and both the processing of Steps S401 to S404 of FIG. 14 for detecting the central position from the output of the integrator 5 by using the optical-center detecting means 21 and the processing of Steps S501 to S504 of FIG. 15 for detecting the central position from the output of the position detecting sensor 10 by the optical-center detecting means 21 correspond to the operation of position detecting means.

As described above, in the fourth embodiment, before the control of the VAP 9 is actually turned off, the cutoff frequency of each of the phase and gain correcting circuit 4 and the integrator 5 is gradually increased until the output of the vibration gyro 1 is limited so that the VAP 9 can return to the central position. After the VAP 9 has returned to the central position, the control of the VAP 9 is turned off. Accordingly, it is possible to prevent an image from moving to a great extent at the instant when the control of the VAP 9 is turned off.

Although the above description has referred to several image-shake correcting devices for video cameras by way of examples, the present invention is not limited to video cameras and can be applied to normal cameras or any other apparatus which has or needs an image-shake correcting mechanism.

As is apparent from the above description, according to the third embodiment, there is provided an improved image-shake correcting device for a video camera or the like which is arranged to generate the amount of correction of an image shake from a detected-vibration output of a vibration gyro and control the driving of image-shake correcting means such as a VAP. The improved image-shake correcting device includes passband varying means for varying the characteristics of passband limiting means for limiting a passband, at the instant when the image-shake correcting means such as a VAP is switched from its stopped state to its driven state by switching means for driving or stopping the image-shake correcting means. Accordingly, an image is prevented from moving to a great extent owing to an unnecessary motion of the VAP which occurs at the instant when the VAP is switched from its off state to its on state, whereby it is possible to improve the quality of a video image.

According to the fourth embodiment, there is provided another improved image-shake correcting device for a video camera or the like which is arranged to generate the amount of correction of an image shake from a detected-vibration output of a vibration gyro and control the driving of image-shake correcting means such as a VAP. The improved image-shake correcting device includes position detecting means for detecting a driving position of the image-shake correcting means such as a VAP, passband varying means for varying the characteristics of passband limiting means for limiting a passband, at the instant when the image-shake correcting means such as a VAP is switched from its driven state to its stopped state by switching means for driving or stopping the image-shake correcting means, and stopping means for stopping the image-shake correcting means after confirming the output of the position detecting means. Accordingly, an image is securely prevented from moving to a great extent owing to an unnecessary motion of the VAP which occurs at the instant when the VAP is switched from its on state to its off state, whereby it is possible to improve the quality of a video image.

According to the third embodiment, at the instant when the VAP is switched from the stopped state to the driven state by the switching means, the passband varying means increases the cutoff frequency of the passband limiting means up to a predetermined value and then gradually decreases the cutoff frequency to a steady value. Accordingly, the image-shake correcting device can restrain the VAP from making a great motion at the instant when the VAP is switched from the stopped state to the driven state.

According to the fourth embodiment, at the instant when the VAP is switched from the driven state to the stopped state by the switching means, the passband varying means increases the cutoff frequency of the passband limiting means on a step-by-step basis and returns the cutoff frequency to a steady value after the VAP stops. Accordingly, the image-shake correcting device can restrain the VAP from making a great motion at the instant when the VAP is switched from the driven state to the stopped state, and also can detect a vibration even after the VAP stops.

According to the fourth embodiment, at the instant when the image-shake correcting means is switched from the driven state to the stopped state by the switching means for driving or stopping the image-shake correcting means, the passband varying means is made to vary the characteristics of the passband limiting means for limiting the passband, and also the position detecting means detects the driving position of the image-shake correcting means and the stopping means stops the image-shake correcting means after confirming the driving position detected by the position detecting means. Accordingly, the output of detecting means (the vibration gyro) for detecting a vibration is limited at the instant when the image-shake correcting means is switched from the driven state to the stopped state by the switching means, whereby it is possible to restrain the image-shake correcting means from making a great motion at that instant.

A fifth embodiment of the present invention will be described below.

The fifth embodiment is intended to prevent malfunction of an AF or AE operation due to an image shake, particularly, to effectively prevent malfunction from occurring due to an image shake in an image pickup apparatus having the function of allowing AF and AE areas to be set, as by visual-line detection. The construction and operation of the fifth embodiment will be described below in that order.

The fifth embodiment relates to an image pickup apparatus and method for performing focus adjustment and exposure adjustment relative to a position selected by specifying a particular point or portion in the image plane of a picked-up image.

In the field of domestic-use image pickup apparatuses such as video cameras, various proposals have been made so that a higher-quality image can be produced more easily. Autofocus (AF) control and automatic exposure (AE) control which have recently been incorporated in a video camera as standard functions are intended to eliminate the awkward operation of adjusting focus and exposure during each photographic cycle, and both of them are typical examples of functions for easily producing a high-quality image.

However, AF and AE mechanisms provided in an image pickup apparatus, such as a video camera, are arranged to "independently" make a determination as to a photographic status and adjust a lens position and an iris to a state suited to that status, and the image pickup apparatus may produce a picked-up image which does not reflect the photographic intention of a photographer. For example, if a far subject and a near subject coexist in one scene to be picked up as an image and an AF operation is executed on the basis of information obtained from the whole of such one scene, the image pickup apparatus will bring any one of the subjects into focus, but is unable to determine whether the focused subject coincides with a main subject which the photographer desires to focus. If an AE operation is executed on the basis of information obtained from the whole of a scene in which a main subject is located against a background of bright sky, the image pickup apparatus will adjust the iris to the brightness of the sky so that the main subject will be darkened.

To avoid such a situation as securely as possible, it is general practice to adopt the technique of concentrating distance measurement and light measurement on a subject located in the center of a scene to be picked up as an image, and executing AF and AE operations on the basis of the result. This technique is based on the fact that many photographers often locate a main subject in the center of the image plane of the image pickup apparatus. As a result, the technique offers the problem that if a photographer locates a main subject at a position other than the center of the image plane of the image pickup apparatus, it is impossible to appropriately adjust focus and exposure with respect to the main subject.

To cope with this problem, it has been proposed to provide an image pickup apparatus which allows a photographer who is looking into the viewfinder to select a main subject by means of a visual line so that optimum focus and exposure can be obtained wherever the main subject is located (Japanese Patent Application Serial No. Hei 4-154165). According to the image pickup apparatus, the photographer can arbitrarily change the position of the main subject while limiting a distance and light measuring area. Position specifying means for selecting the main subject is not limited to visual-line detecting means, and it is possible to adopt a joy stick, a mouse or other similar means for determining a direction in which and a position toward which to move the main subject, by combining the amounts by which it travels along two or more axes.

A center-fixed distance measuring system and a position-of-visual-line detection type of distance measuring system differ in regard to the manner of setting an optimum distance measuring area in an image plane. In the center-fixed distance measuring system, if a main subject is located at a position other than the center of the image plane, it is impossible to appropriately adjust focus with respect to the main subject. To restrain occurrence of this problem, the distance measuring area is set to occupy a relatively large area in the image plane. In the position-of-visual-line detection type of distance measuring system, the distance measuring area is set to occupy a relatively small area in the image plane so that, wherever in the image plane a main subject is located, the distance measuring area can be moved to the position of the main subject to effect optimum focusing.

However, in the above-described position-of-visual-line detection type of distance measuring system, since a small distance measuring area is employed, an AF evaluation value obtainable from that area tends to easily vary and is susceptible to a disturbance, such as a subject repeatedly moving out of and into a scene which is being photographed. If a variation occurs in the AF evaluation value, the position-of-visual-line detection type of distance measuring system is unable to determine whether the variation has resulted from a variation in the distance to a main subject or a camera manipulation, such as panning, which does not involve a variation in the distance to the main subject, i.e., whether to move a focusing lens. As a result, defocusing is induced.

The fifth embodiment has been made to solve the above-described problems, and its object is to provide an image pickup apparatus and method which realize AF performance capable of appropriately adjusting focus with respect to a main subject by means of an external input position limitation type of distance measuring system, such as a visual-line detection distance measuring system, without lowering the level of AF performance achievable in a general center-fixed distance measuring system.

To achieve the above object, in accordance with a preferred embodiment of the present invention, there is provided an image pickup apparatus which comprises motion detecting means for detecting a motion of image pickup means, specifying means for specifying a photographing position of a picked-up image signal outputted from the image pickup means, signal extracting means for extracting a predetermined frequency component from the picked-up image signal, area extracting means for taking out an area in an image plane which area is determined on the basis of the specifying means, from the picked-up image signal extracted by the signal extracting means, focus adjusting control means for performing focus adjustment on the basis of an output of the area extracting means, and area varying means for varying the area to be taken out, according to the motion detected by the motion detecting means.

In accordance with a preferred embodiment of the present invention, there is provided an image pickup apparatus which comprises motion detecting means for detecting a motion of image pickup means, specifying means for specifying a photographing position of a picked-up image signal outputted from the image pickup means, signal extracting means for extracting a predetermined frequency component from the picked-up image signal, area extracting means for taking out an area in an image plane which area is determined on the basis of the specifying means, from the picked-up image signal extracted by the signal extracting means, focus adjusting control means for performing focus adjustment on the basis of an output of the area extracting means, and variation-of-area inhibiting means for inhibiting variation of the area to be taken out, according to the motion detected by the motion detecting means.

In accordance with a preferred embodiment of the present invention, there is provided an image pickup apparatus which comprises motion detecting means for detecting a motion of image pickup means, specifying means for specifying a photographing position of a picked-up image signal outputted from the image pickup means, signal extracting means for extracting a predetermined frequency component from the picked-up image signal, area extracting means for taking out an area in an image plane which area is determined on the basis of the specifying means, from the picked-up image signal extracted by the signal extracting means, focus adjusting control means for performing focus adjustment on the basis of an output of the area extracting means, and setting means for setting an operation of the focus adjustment to an enabled state or an inhibited state, according to the motion detected by the motion detecting means.

The specifying means includes display means for displaying the picked-up image signal outputted from the image pickup means in a viewfinder and detecting means for detecting a fixation point in the viewfinder which a photographer is looking at.

In accordance with a preferred embodiment of the present invention, there is provided an arrangement which detects a motion of image pickup means, specifies a photographing position of a picked-up image signal outputted from the image pickup means, extracts a predetermined frequency component from the picked-up image signal, takes out an area in an image plane which area is determined on the basis of the specifying means, from the picked-up image signal extracted by the signal extracting means, performs focus adjustment on the basis of an output of the area extracting means, and varies the area to be taken out, according to the motion detected by the motion detecting means.

The image pickup apparatus according to the fifth embodiment of the present invention will be described below. The image pickup apparatus according to the fifth embodiment is applied to a video camera.

Figure 16:
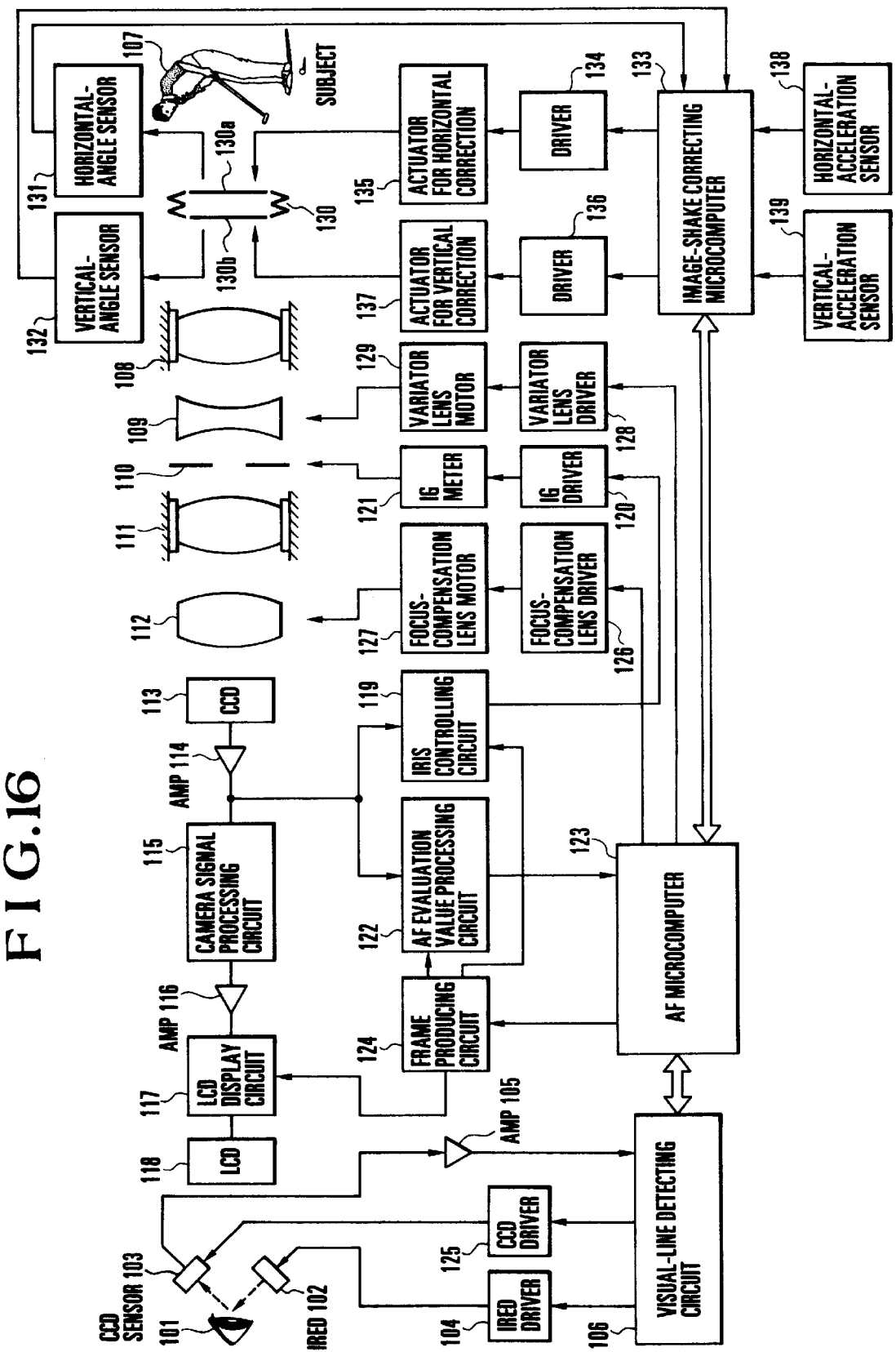
FIG. 16 is a block diagram showing the construction of a video camera according to a fifth embodiment of the present invention.

FIG. 16 is a block diagram showing the construction of the video camera according to the fifth embodiment. In FIG. 16, reference numeral 101 denotes the eyeball of a photographer who looks into a viewfinder of the video camera, and reference numeral 107 denotes a subject.

The video camera shown in FIG. 16 includes an infrared-rays emitting diode 102 for projecting infrared rays onto the eyeball 101 to detect the position of the visual line of the eyeball 101, a CCD sensor 103 for receiving infrared rays reflected from the eyeball 101, a driver 125 for driving the CCD sensor 103, a driver 104 for driving the infrared-rays emitting diode 102, an amplifier 105, and a visual-line detecting circuit 106 for analyzing the position of the visual line of the eyeball 101 from the output signal of the amplifier 105.

The video camera also includes a first fixed lens group 108, a variator lens 109, an iris 110, a third fixed lens group 111, a focus-compensation lens 112 having both the function of adjusting focus and the function of compensating for a displacement of a focal plane due to zooming, an image pickup element 113 which includes a CCD, an amplifier 114, a camera signal processing circuit 115 for processing the output signal of the amplifier 114 and producing a television signal, an amplifier 116, an LCD display circuit 117 for driving a liquid-crystal monitor provided in the viewfinder, a liquid-crystal monitor 118 for displaying a picked-up image in the viewfinder, and an iris controlling circuit 119 for adjusting the iris 110 on the basis of the output signal of the amplifier 114 and holding the amount of light of the picked-up image at an appropriate level. The iris controlling circuit 119 is a gate circuit for sampling only the predetermined portion of a video signal that is set by a frame producing circuit 124.

The video camera also includes an IG meter driving circuit 120, an IG meter 121 for driving the iris 110, and an AF evaluation value processing circuit 122 for generating a signal for focus evaluation from the output signal of the amplifier 114. To generate an evaluation value, the AF evaluation value processing circuit 122 includes a filter and a gate circuit for sampling only the predetermined portion of a video signal that is set by the frame producing circuit 124. An AF microcomputer 123 executes focus adjustment based on the output signal of the AF evaluation value processing circuit 122, focus compensation during zooming, control of the iris controlling circuit 119 and control of an inputting frame. The frame producing circuit 124 defines an inputting area which is needed when video information relative to a picked-up image is to be inputted into the AF evaluation value processing circuit 122 or the iris controlling circuit 119, and outputs a gate signal to the AF evaluation value processing circuit 122 or the iris controlling circuit 119. The frame producing circuit 124 also outputs a display signal for display of the inputting area to the LCD display circuit 117. The LCD display circuit 117 combines the display signal supplied from the frame producing circuit 124 with the video signal supplied from the amplifier 116 and outputs the resultant signal to the liquid-crystal monitor 118.

The video camera also includes a focus-compensation lens motor driving circuit 126, a focus-compensation lens motor 127, a variator lens motor driving circuit 128, and a variator lens motor 129. The AF microcomputer 123 communicates with the visual-line detecting circuit 106 to obtain information indicative of the fixation point of the photographer.

As shown in FIG. 16, a lens 130 which includes two glass plates 130a and 130b for effecting optical image-shake correction is disposed on the right-hand side of the first fixed lens group 108. The glass plates 130a and 130b are connected to each other by a bellows, and the gap between the glass plates 130a and 130b is charged with a silicone liquid. The glass plates 130a and 130b correct horizontal and vertical motions of a picked-up image, respectively. The turning angles of the glass plates 130a and 130b are respectively detected by angle sensors 131 and 132 and sent to a microcomputer 133 for controlling an image-shake correcting operation (hereinafter referred to as the image-shake correcting microcomputer 133).

The motion of the camera body is detected by acceleration sensors 138 and 139. The acceleration sensors 138 and 139 are provided for detecting horizontal and vertical motions, respectively. The image-shake correcting microcomputer 133 outputs a driving instruction according to detected-acceleration signals supplied from the acceleration sensors 138 and 139, and drivers 134 and 136 output driving signals to an actuator 135 for horizontal correction and an actuator 137 for vertical correction in accordance with the driving instruction, thereby driving the glass plates 130a and 130b.

The AF microcomputer 123 performs two-way communication with the image-shake correcting microcomputer 133 to obtain motion information relative to the camera body, for example, information indicating whether the camera body is in a stationary but hand-held state in which a vibration of a hand can be detected or in a fixed state in which the camera body is attached to a tripod or the like, information indicating whether the camera body is being panned rapidly or slowly, acceleration-sensor information and information indicative of a turning angle for image-shake correction.

Figure 17:
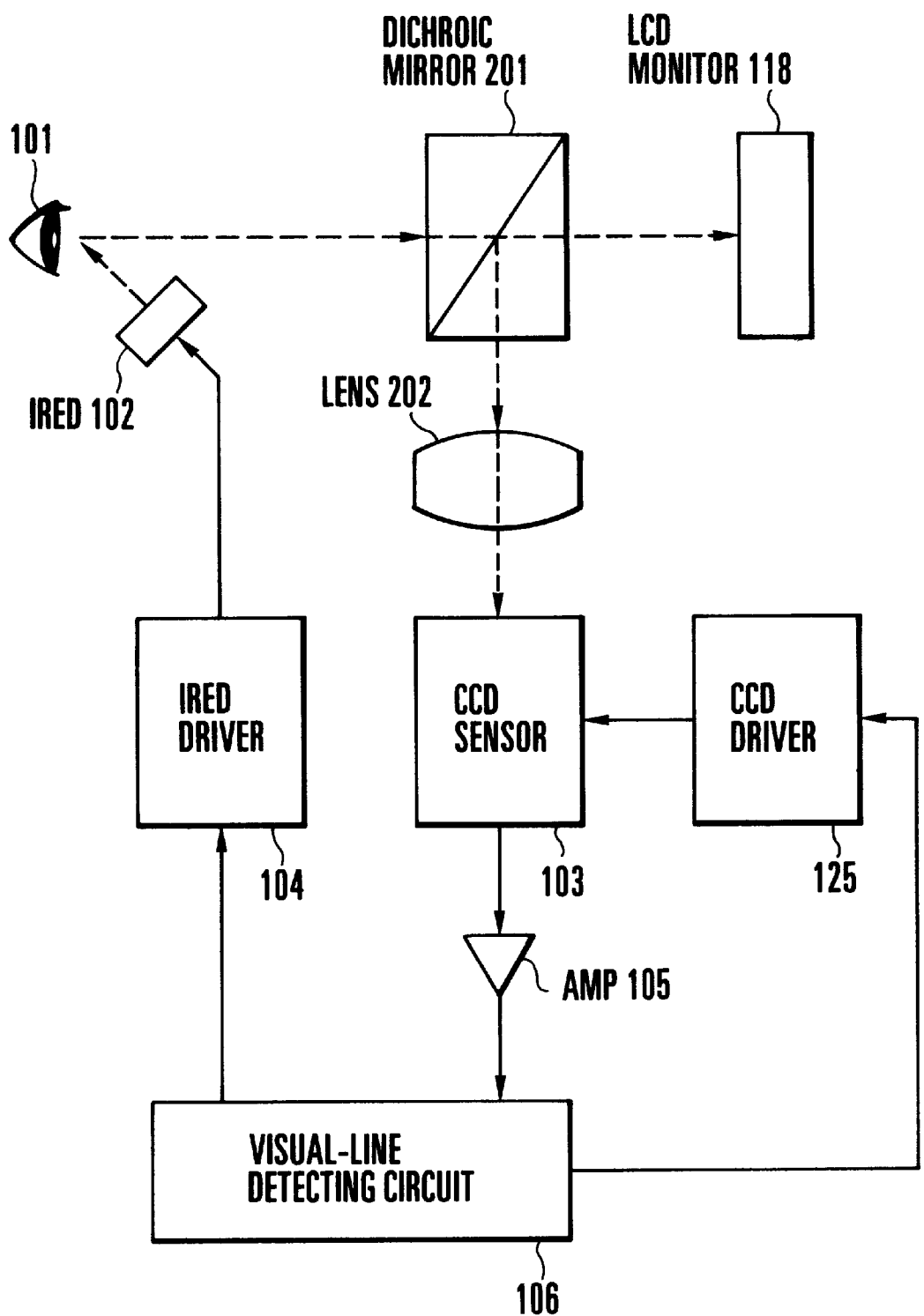
FIG. 17 is a block diagram showing the construction of a visual-line detecting part.

FIG. 17 is a block diagram showing the construction of a visual-line detecting part. As shown in FIG. 17, the driver 104 drives the infrared-rays emitting diode 102 in accordance with a control signal supplied from the visual-line detecting circuit 106. Infrared light emitted from the infrared-rays emitting diode 102 is reflected by the eyeball 101 and the reflected infrared light reaches the dichroic mirror 201 which reflects only infrared light. The reflected infrared light is directed toward a focusing lens 202 by the dichroic mirror 201, and reaches the CCD sensor 103 through the focusing lens 202.

The driver 125 drives the CCD sensor 103 and the infrared light reflected by the eyeball 101 is converted into an electrical signal by the CCD sensor 103, and the electrical signal is supplied to the visual-line detecting circuit 106 through the amplifier 105. Thus, while the eyeball 101 is looking at the liquid-crystal monitor 118 which is displaying a picked-up image, the visual-line detecting circuit 106 can detect which position on the liquid-crystal monitor 118 the eyeball 101 is looking at. The visual-line detecting circuit 106 detects the position coordinates of the visual line from the output signal of the amplifier 105. Information indicative of the detected position coordinates of the visual line is transmitted from the visual-line detecting circuit 106 to the AF microcomputer 123.

The video camera according to the fifth embodiment adopts a TVAF type of autofocus system. The TVAF system is a focusing system in which a high-frequency component of a picked-up image signal is extracted by the AF evaluation value processing circuit 122 and the AF microcomputer 123 causes the focus-compensation lens 112 to travel in parallel with the optical axis via the focus-compensation lens motor driving circuit 126 and the focus-compensation lens motor 127 so that the level of the high-frequency component can reach a maximum.

In this autofocus system, since a high-frequency component contained in a video signal is detected as described above, the video signal inputted into the AF evaluation value processing circuit 122 must contain an edge portion (a portion representative of a level variation). Although the aforesaid autofocus system must use a video signal for at least one horizontal scanning line, an inputting area having a predetermined area size is needed in practice.

Figure 18:
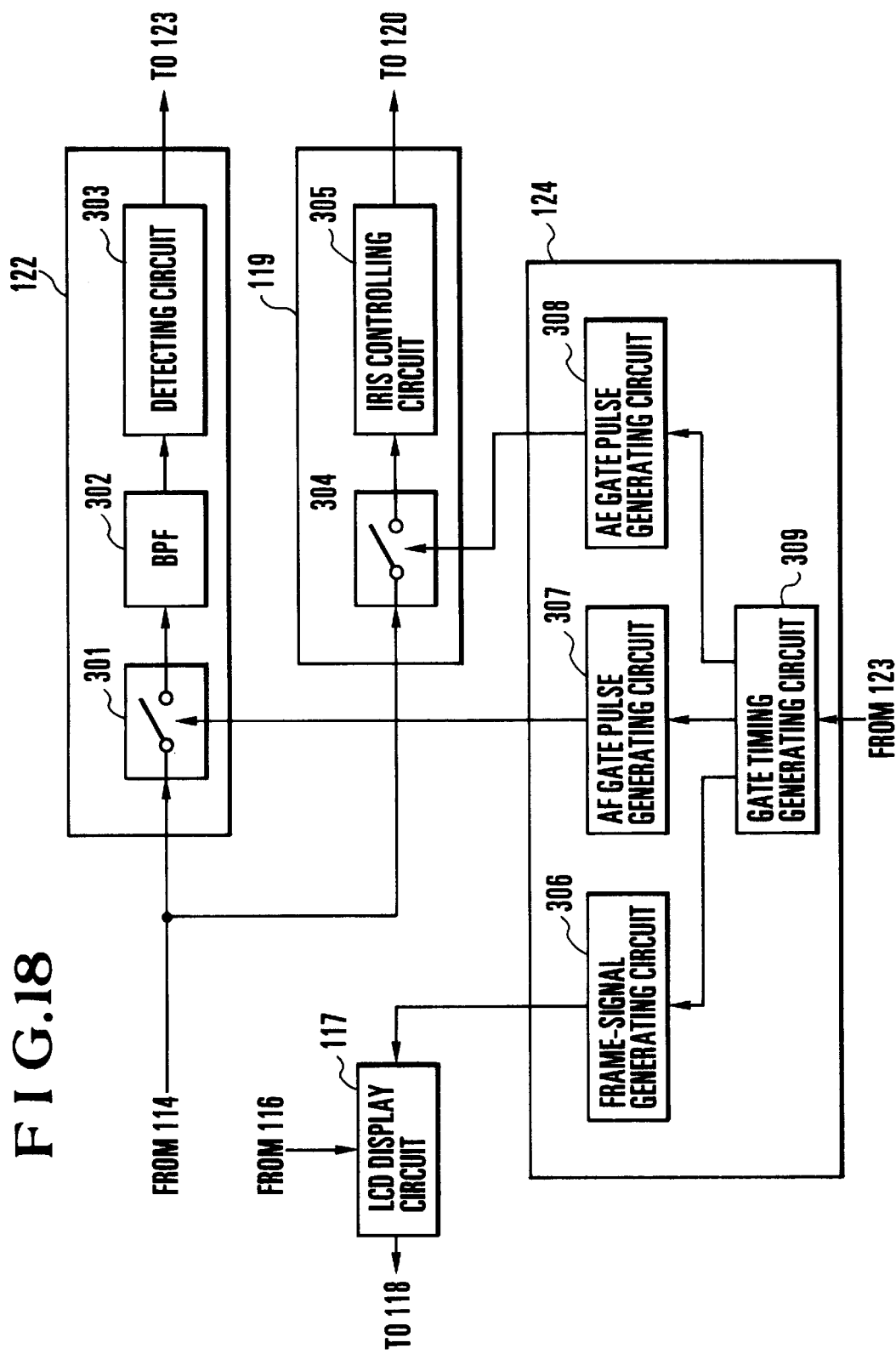
FIG. 18 is a block diagram showing a portion for performing gate processing for inputting a video signal after an inputting area has been defined by an AF microcomputer 123.

FIG. 18 is a block diagram showing a portion for performing gate processing for inputting a video signal into the AF evaluation value processing circuit 122 after an inputting area has been defined by the AF microcomputer 123. First, information relative to the size and the position of an inputting area is transmitted from the AF microcomputer 123 to a gate timing generating circuit 309 inside the frame producing circuit 124. At this time, the AF microcomputer 123 outputs an instruction to produce a frame, in accordance with information indicative of the position of the visual line within an image plane, which information is supplied from the visual-line detecting circuit 106. The gate timing generating circuit 309 outputs a gate timing signal to a frame-signal generating circuit 306 on the basis of the instruction information supplied from the AF microcomputer 123, and the frame-signal generating circuit 306 transmits a frame signal for displaying the aforesaid inputting area to the LCD display circuit 117. In the meantime, the gate timing generating circuit 309 outputs an AF/AE gate timing signal to both an AF gate pulse generating circuit 307 for generating a gate pulse corresponding to an inputting area for AF and an AE gate pulse generating circuit 308 for generating a gate pulse corresponding to an inputting area for AE.

The AF evaluation value processing circuit 122 is basically made up of a gate circuit 301, a band-pass filter 302 and a detecting circuit 303, and only while the gate circuit 301 is closed by the output signal of the AF gate pulse generating circuit 307, a picked-up image signal is supplied from the amplifier 114 to the band-pass filter 302. The iris controlling circuit 119 is basically made up of a gate circuit 304 and an iris controlling circuit 305, and only while the gate circuit 304 is closed by the output signal of the AE gate pulse generating circuit 308, the picked-up image signal is supplied from the amplifier 114 to the iris controlling circuit 119.

FIGS. 19(A) and 19(B) are explanatory views showing AF evaluation value inputting areas. FIG. 19(B) shows one example of a fixed type of AF evaluation value inputting area which has heretofore been employed. In FIG. 19(B), reference numeral 401 denotes a photographic image plane and reference numeral 404 denotes an AF evaluation value inputting area. In many cases, general photographers perform photography of the desired subject (main subject) 107 while positioning the main subject 107 in the center of the image plane. In general, the AF evaluation value inputting area is smaller than the entire photographic image plane so as to avoid the influence of another subject during photography of the main subject 107, but the AF evaluation value inputting area has a particular area size so as to avoid the influence of a travel of the main subject 107 or a photographic operation of the video camera. For this reason, the AF evaluation value inputting area is fixed at the position shown at 404.

An AF evaluation value inputting area for measuring a distance on the basis a detected position of a visual line is set as shown in FIG. 19(A). In FIG. 19(A), reference numeral 403 denotes a position at which the fixation point of a photographer is currently located. An AF evaluation value inputting area 402 is set so that the position 403 can be centered in the area 402. The AF microcomputer 123 manipulates the AF evaluation value processing circuit 122 via the frame producing circuit 124 to generate an AF evaluation value relative to the AF evaluation value inputting area 402, and the AF evaluation value inputting area 402 is displayed as shown in FIG. 19(A).

If a photographer shifts the fixation point to, for example, the position shown at 405, an AF evaluation value inputting area 406 is set so that the position 405 can be centered in the area 406, and the display of the AF evaluation value inputting area is shifted from the area 402 to the area 406.

By the above-described method, it is possible to focus the subject 107 which the photographer is looking at. In this case, in addition to focusing, it is desirable to appropriately adjust exposure relative to the subject 107 which the photographer is looking at. For this purpose, the frame producing circuit 124 sends a signal for setting an inputting area to the iris controlling circuit 119. Accordingly, simultaneously with an AF operation, it is possible to perform an AE operation by shifting a measured-light information inputting area to a position which the photographer is looking at and performing exposure adjustment based on the measured-light information obtained from that area.

Figure 20:
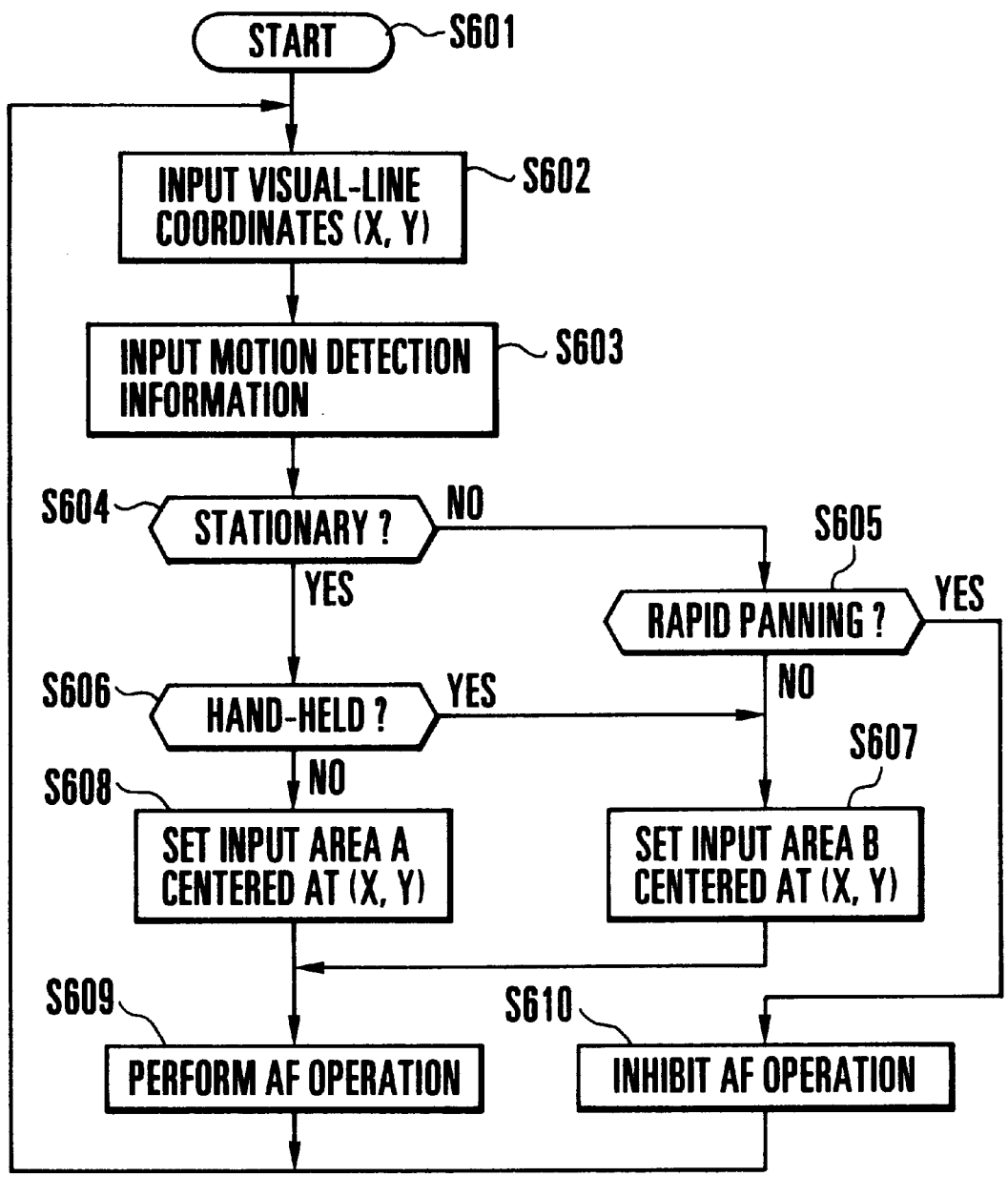
FIG. 20 is a flowchart showing an AF control processing routine.

An AF controlling method, which can prevent the position-of-visual-line detection type of distance measuring system from lowering AF performance compared to the conventional center-fixed distance measuring system, will be described below. FIG. 20 is a flowchart showing a processing routine for such AF controlling method. This flowchart is one example of an algorithm for compensating for an adverse influence which is exerted on an AF operation when the image-shake correcting microcomputer 133 sensitively responds to a camera operation, particularly, panning or the like, to cause a great variation in an AF evaluation value because of the small size of a distance measuring area which is set during a visual-line mode. This algorithm is processed by the AF microcomputer 123.

First, information indicative of the fixation point of the photographer is inputted from the visual-line detecting circuit 106 into the AF microcomputer 123 as visual-line coordinates (X, Y) (Step S602). The coordinates axes of the visual-line coordinates consist of X- and Y-axes which respectively extend vertically and horizontally from the origin, i.e., the top left of the image plane shown in FIG. 19(A).

Then, motion detection information relative to the camera body is inputted from the image-shake correcting microcomputer 133 into the AF microcomputer 123 (Step S603). The AF microcomputer 123 determines whether the camera body is stationary or moving (Step S604). If the camera body is moving, the AF microcomputer 123 determines whether the motion of the camera body is a rapid motion (Step S605). If it is determined that the motion is a rapid panning, the AF microcomputer 123 inhibits an AF operation (Step S610) and returns the process to Step S602.

If it is determined that the motion is a rapid panning, the AF microcomputer 123 continues to receive AF evaluation value data while holding the previously set inputting area, thereby eliminating the influence of a change of subjects when the visual-line coordinates are varied, so that focusing can be completed when the panning is completed, i.e., so that an in-focus point can be immediately detected when the next AF operation is performed after the motion of the camera body starts settling immediately before the completion of the panning.

If it is determined in Step S605 that the motion of the camera body is a slow panning, the AF microcomputer 123 sets an AF evaluation value inputting area of size B so that the visual-line coordinates (X, Y) can be centered in that area (Step S607), and then performs an AF operation (Step S609).

If it is determined in Step S604 that the camera body is in a stationary state, it is determined that the camera body is in a hand-held state (Step S606). If the camera body is in a hand-held state, the process proceeds to Step S607. If the camera body is not in a hand-held state, the AF microcomputer 123 determines that the camera body is in a fixed state, and sets an AF evaluation value inputting area of size A so that the visual-line coordinates (X, Y) can be centered in that area (Step S608). Then, the AF microcomputer 123 performs an AF operation (Step S609). After that, the AF microcomputer 123 again executes the process which starts in Step S602. The sizes A and B of the AF evaluation value inputting areas which are set in Steps S608 and S607 respectively correspond to the size of the visual-line detection distance measuring frame shown in FIG. 19(A) and the size of the center-fixed distance measuring frame shown in FIG. 19(B).

The AF evaluation value inputting area of size A is made wider than that of size B to lower the response of the AF evaluation value to the fixation point so that the camera, even while being moved, can realize good AF during photography. However, the size of the visual-line detection distance measuring frame for displaying the position of the visual line does not need to be varied and is set constant. The size of the visual-line detection distance measuring frame for displaying the position of the visual line is set by processing different from the present processing. Specifically, a display frame area of predetermined size is set so that the coordinates of the visual line can be centered in the display frame area, and information indicative of the display frame area is outputted to the gate timing generating circuit 309 provided in the frame producing circuit 124, thereby setting the size of the visual-line detection distance measuring frame for displaying the position of the visual line.

As is apparent from FIG. 20, the fluctuation of an AF evaluation value due to a motion of a camera is restrained by varying the size or the position of a distance measuring area according to the amount of the motion of the camera body or by inhibiting the variation of the size or the position of the distance measuring area. Accordingly, it is possible to prevent malfunction of the AF system of the camera so that a subject can be easily aimed at, whereby it is possible to improve visual-line AF performance. In addition, since an AF operation is inhibited or enabled according to the amount of motion of the camera, even if an AF evaluation value signal greatly varies, the AF system is restrained from immediately searching for the subject and starts the AF operation after the motion of the camera has settled to some extent and the AF evaluation value has been stabilized. Accordingly, it is possible to eliminate the disadvantage that t he AF system fails to aim at the subject or causes unnecessary defocusing.

Figure 21:
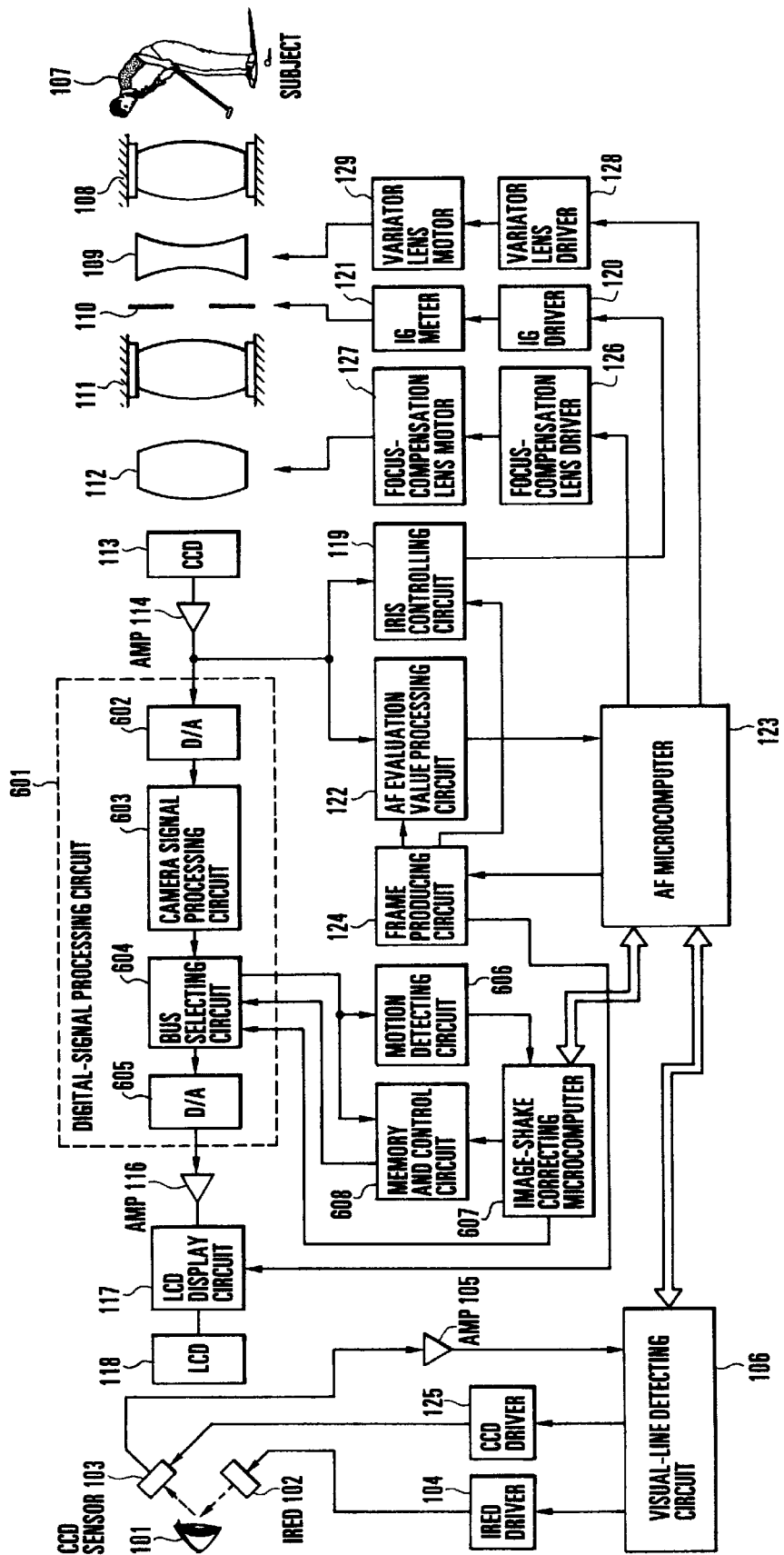
FIG. 21 is a block diagram showing the construction of a video camera according to a sixth embodiment of the present invention.

A video camera according to a sixth embodiment of the present invention will be described below. FIG. 21 is a block diagram showing the construction of the video camera according to the sixth embodiment of the present invention. The video camera according to the sixth embodiment employs an electronic image-shake correcting circuit in place of the optical image-shake correction processing circuit (130 to 137) used in the fifth embodiment. The other constituent elements are identical to those used in the fifth embodiment.

A video signal photoelectrically converted by the image pickup element 113 is amplified by the amplifier 114, and the signal outputted from the amplifier 114 is subjected to camera signal processing and image-shake correction processing in a digital-signal processing circuit 601. The thus-processed signal is outputted to the amplifier 116. The digital-signal processing circuit 601 includes an A/D converter 602, a camera signal processing circuit 603, a bus selecting circuit 604 and a D/A converter 605.

The bus selecting circuit 604 is a switching circuit for switching a direction in which to output the video signal. The bus selecting circuit 604 determines whether to output the video signal to the D/A converter 605 or to a motion detecting circuit 606 and a field memory and memory control circuit 608, according to a signal supplied from an electronic image-shake correcting microcomputer 607. Information indicative of the motion of the subject 107 detected by the motion detecting circuit 606 is outputted to the electronic image-shake correcting microcomputer 607. The electronic image-shake correcting microcomputer 607 determines whether the whole or part of the image plane is moving, i.e., whether the camera is moving, according to the motion signal outputted from the motion detecting circuit 606. If it is determined that the whole of the image plane is moving, the electronic image-shake correcting microcomputer 607 outputs a correcting instruction to correct the motion of the image plane.

The field memory and memory control circuit 608 selects an area according to the correcting signal and extracts it from the video information stored in the field memory and memory control circuit 608, and returns the extracted area to the digital-signal processing circuit 601. The sixth embodiment performs electronic image-shake correction through the above-described processing. The AF microcomputer 123 performs two-way communication with the electronic image-shake correcting microcomputer 607 to obtain motion information relative to the camera body which is processed in the electronic image-shake correcting microcomputer 607, for example, motion vector information, information indicating whether the camera is stationary or moving, information indicating whether the camera is hand-held or fixed to a tripod, and information indicating whether the camera is being panned rapidly or slowly.

According to the sixth embodiment, since the AF microcomputer 123 executes control using the algorithm shown in FIG. 20 according to the camera motion information obtained from the electronic image-shake correction control circuit, it is possible to prevent malfunction or defocusing from occurring during visual-line AF, panning or the like.

Figure 22:
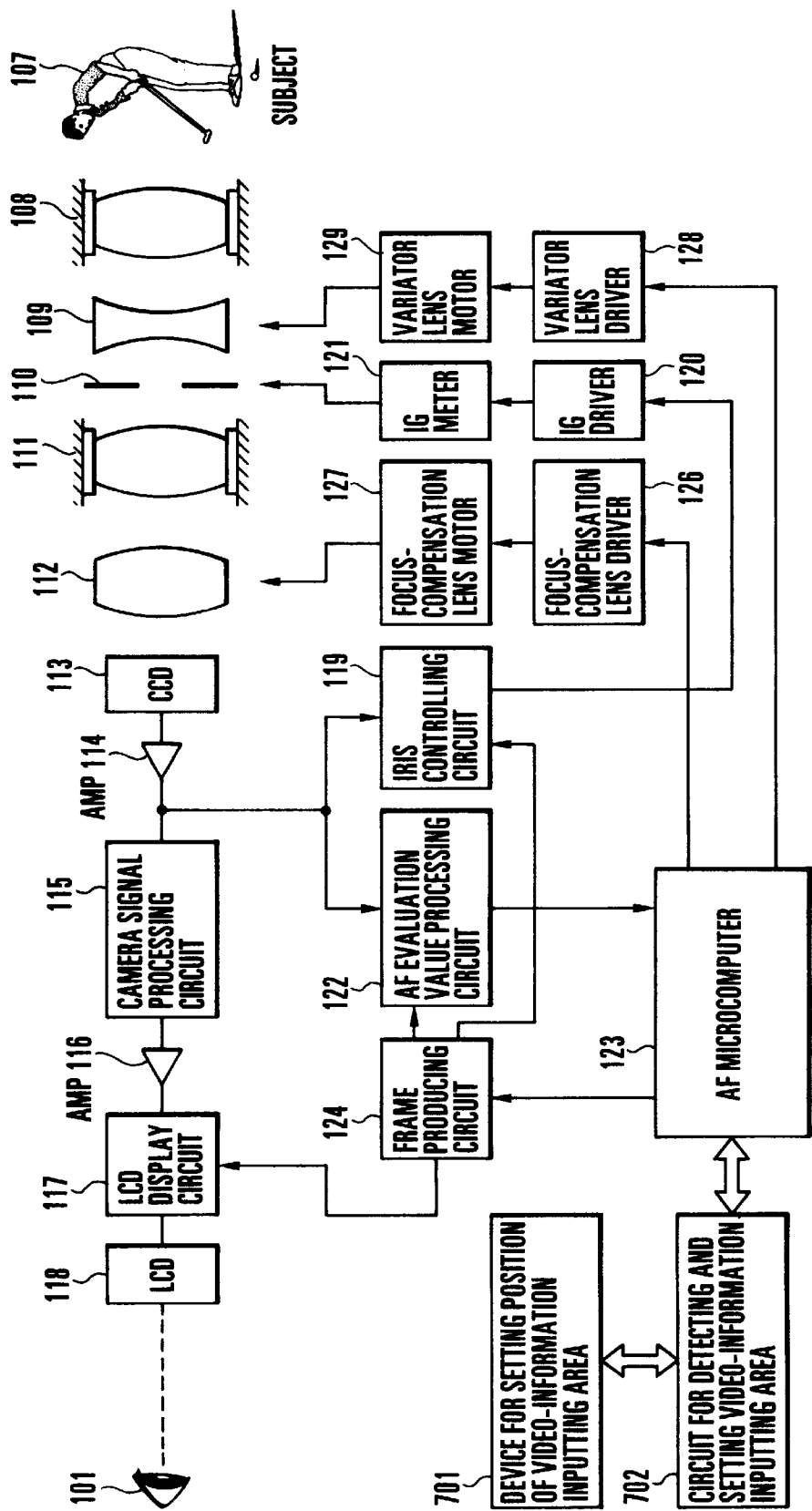
FIG. 22 is a block diagram showing the construction of a video camera according to a seventh embodiment of the present invention.

A video camera according to a seventh embodiment of the present invention will be described below. FIG. 22 is a block diagram showing the construction of the video camera according to the seventh embodiment of the present invention. In the seventh embodiment, a video-information inputting area is determined not by visual-line inputting means but by external inputting means. A video-information inputting area which is set by a device 701 for setting the position of the video information inputting area is processed by a circuit 702 for detecting and setting the video-information inputting area, and is then transmitted to the AF microcomputer 123. The AF microcomputer 123 transmits information indicative of the position and the size of a frame to the frame producing circuit 124, and executes control equivalent to that performed in the fifth embodiment. The device 701 for setting the position of the video information inputting area may be a general input device for a computer, such as a keyboard, a mouse, a track ball or a joy stick.

In accordance with the above-described embodiments of the present invention, a motion of image pickup means is detected by motion detecting means, a photographing position of a picked-up image signal outputted from the image pickup means is specified by specifying means, and a predetermined frequency component is extracted from the picked-up image signal by signal extracting means. Area extracting means takes out an area in an image plane which area is determined on the basis of the specifying means, from the picked-up image signal extracted by the signal extracting means, and focus adjusting control means performs focus adjustment on the basis of an output of the area extracting means, and the area to be taken out is varied by area varying means according to the motion detected by the motion detecting means. Accordingly, by varying the size of a distance measuring area according to the amount of motion of the image pickup means provided by the motion detecting means, it is possible to suppress a variation in an autofocus (AF) evaluation value due to the motion and to prevent malfunction of an AF system. In addition, since a subject can be easily aimed at, it is possible to improve visual-line AF performance.

In accordance with the above-described embodiments of the present invention, a motion of image pickup means is detected by motion detecting means, a photographing position of a picked-up image signal outputted from the image pickup means is specified by specifying means, and a predetermined frequency component is extracted from the picked-up image signal by signal extracting means. Area extracting means takes out an area in an image plane which area is determined on the basis of the specifying means, from the picked-up image signal extracted by the signal extracting means, focus adjusting control means performs focus adjustment on the basis of an output of the area extracting means, and variation-of-area inhibiting means inhibits variation of the area to be taken out, according to the motion detected by the motion detecting means. Accordingly, it is also possible to adopt a conventional fixed type of distance measuring system in which the position and the size of the distance measuring area are fixed irrespective of the amount of the motion.

In accordance with the above-described embodiments of the present invention, a motion of image pickup means is detected by motion detecting means, a photographing position of a picked-up image signal outputted from the image pickup means is specified by specifying means, and a predetermined frequency component is extracted from the picked-up image signal by signal extracting means. Area extracting means takes out an area in an image plane which area is determined on the basis of the specifying means, from the picked-up image signal extracted by the signal extracting means, focus adjusting control means performs focus adjustment on the basis of an output of the area extracting means, and setting means sets an operation of the focus adjustment to an enabled state or an inhibited state, according to the motion detected by the motion detecting means. Accordingly, since an AF operation is inhibited or enabled according to the amount of the motion of the image pickup means, even if an AF evaluation value signal greatly varies, the AF system is restrained from immediately searching for the subject and starts the AF operation after the motion of the image pickup means has settled to some extent and the AF evaluation value has been stabilized. Accordingly, it is possible to eliminate the disadvantage that the AF system fails to aim at the subject or causes unnecessary defocusing.

In accordance with the above-described embodiments of the present invention, display means displays the picked-up image signal outputted from the image pickup means in a viewfinder, and detecting means detects a fixation point in the viewfinder which a photographer is looking at. Accordingly, it is possible to accurately aim at a main subject which the photographer desires to look fixedly at.

In accordance with the above-described embodiments of the present invention, a motion of the image pickup means is detected, a photographing position of a picked-up image signal outputted from the image pickup means is specified, and a predetermined frequency component is extracted from the picked-up image signal. The area in an image plane which area is determined on the basis of the specifying means is taken out from the picked-up image signal extracted by the signal extracting means, focus adjustment is performed on the basis of an output of the area extracting means, and the area to be taken out is varied according to the motion detected by the motion detecting means. Accordingly, by varying the size of a distance measuring area according to the amount of the motion of the image pickup means provided by the motion detecting means, it is possible to suppress a variation in an autofocus (AF) evaluation value due to the motion and to prevent malfunction of the AF system. In addition, since a subject can be easily aimed at, it is possible to improve visual-line AF performance.

What is claimed is:

1. An image-shake correcting device comprising:
   detecting means for detecting a vibration;
   correcting means for correcting a motion of an image due to the detected vibration;
   limiting means for limiting a response of said correcting means to an output of said detecting means;
   switching means for switching between an operating state and a non-operating state of said correcting means; and
   control means for temporarily shifting a cut off frequency of a frequency response characteristic of said limiting means to a higher side in response to said correcting means being switched from the non-operating state to the operating state by said switching means.

2. A device according to claim 1, wherein said correcting means includes a variable angle prism.

3. A device according to claim 1, wherein said detecting means includes a vibration gyro sensor.

4. A device according to claim 1, wherein said detecting means includes an angular velocity sensor.

5. An image-shake correcting device comprising:
   detecting means for detecting a vibration;
   correcting means for correcting a motion of an im a ge due to the detected vibration;
   limiting means for limiting a response of said correcting means to an output of said detecting means;
   switching means for switching a operating state and a non-operating state of said correcting means;
   means for temporarily shifting a cut off frequency of a frequency response characteristic of said limiting means to a higher side in response to said correcting means being switched from the operating state to the non-operating state by said switching means; and
   control means for controlling said correcting means according to said switching means.

6. An image-shake correcting device according to claim 5, wherein said means for changing increases a cutoff frequency of said limiting means up to a predetermined value when said correcting means is switched from the non-operating state to the operating state by said switching means, and then gradually decreases the cutoff frequency to a steady value.

7. An image-shake correcting device according to claim 5, wherein said means for changing increases a cutoff frequency of said limiting means on a step-by-step basis when said correcting means is switched from the operating state to the non-operating state by said switching means, and returns the cutoff frequency to a steady value after said correcting means is stopped.

8. An image-shake correcting device according to claim 5, wherein said control means includes position detecting means for detecting a driving position of said correcting means based on an output of said limiting means, and wherein said control means confirms through said position detecting means a return of said correcting means to a central position after an initial variation of the characteristic of said limiting means by the means for changing and brings said correcting means to the non-operating state.

9. An image-shake correcting device according to claim 5, wherein said control means includes position detecting means for detecting a driving position of said correcting means based on an output of said limiting means.

10. An image-shake correcting device according to claim 5, wherein said control means includes position detecting means for detecting a driving position of said correcting means from an.

11. An image-shake correcting device according to claim 5, wherein said control means includes position detecting means for detecting a driving position of said correcting means on the basis of an output from said limiting means.

12. An image stabilizing apparatus comprising:

detecting means for detecting a motion of an image;

correcting means for correcting the detected motion;

processing means for computing control information for driving said correcting means to correct the motion of the image;

selecting means for selecting between a power-on state and a power-off state of said correcting means; and control means for temporarily shifting a cut off frequency of a frequency characteristic of a system comprising said detecting means, said correcting means, and said computing means, to a higher side in response to a selecting operation by said selecting means.

13. Apparatus according to claim 12, wherein said control means changes the response of the system in response to switching the correcting means from the non-operating state to the operating state.

14. Apparatus according to claim 13, wherein said control means resets the change of the response after a predetermined time has passed since the switching operation.

15. Apparatus according to claim 12 or 14, wherein the response comprises a frequency response characteristic.

16. Apparatus according to claim 12, wherein said detecting means includes an angular velocity sensor, and wherein said correcting means includes a variable angle prism.

* * * * *

UNITED STATES PATENT AND TRADEMARK OFFICE
CERTIFICATE OF CORRECTION

PATENT NO. : 6,078,751
DATED : June 20, 2000
INVENTOR(S) : TATSUYA YAMAZAKI, ET AL.

It is certified that error appears in the above-identified patent and that said Letters Patent is hereby corrected as shown below:

COLUMN 1:
    Line 50, "(RCOM)" should read --(MCOM)--.

COLUMN 11:
    Line 56, "off Won" should read --off→on--.

COLUMN 23:
    Line 34, "t he" should read --the--.

COLUMN 26:
    Line 27, "im a ge" should read --image--.

Signed and Sealed this

Seventeenth Day of April, 2001

Attest:

NICHOLAS P. GODICI

Attesting Officer    Acting Director of the United States Patent and Trademark Office